US009031613B2

(12) United States Patent
Jiang et al.

(10) Patent No.: US 9,031,613 B2
(45) Date of Patent: May 12, 2015

(54) JOINT COMMUNICATION AND ELECTROMAGNETIC OPTIMIZATION OF A MULTIPLE-INPUT MULTIPLE-OUTPUT ULTRA WIDEBAND BASE STATION ANTENNA

(75) Inventors: Ning Jiang, Fredericton (CA); Ian Bryce Haya, Ottawa (CA); Bruce Gordon Colpitts, Fredericton (CA); Brent Robert Petersen, Fredericton (CA)

(73) Assignee: University of New Brunswick, Fredericton, New Brunswick (CA)

( * ) Notice: Subject to any disclaimer, the term of this patent is extended or adjusted under 35 U.S.C. 154(b) by 600 days.

(21) Appl. No.: 12/341,417

(22) Filed: Dec. 22, 2008

(65) Prior Publication Data

US 2009/0186658 A1 Jul. 23, 2009

Related U.S. Application Data

(60) Provisional application No. 61/099,078, filed on Sep. 22, 2008, provisional application No. 61/008,591, filed on Dec. 21, 2007.

(51) Int. Cl.
*H04M 1/00* (2006.01)
*H01Q 21/06* (2006.01)

(52) U.S. Cl.
CPC .................................. *H01Q 21/061* (2013.01)

(58) Field of Classification Search
CPC ... H01Q 21/067; H01Q 19/10; H01Q 21/061; H04W 24/00
USPC ......... 455/562.1, 62, 450, 507, 101; 370/230; 375/302, 303, 304, 320
See application file for complete search history.

(56) References Cited

U.S. PATENT DOCUMENTS

| | | | | |
|---|---|---|---|---|
| 6,611,236 | B1 | 8/2003 | Nilsson | |
| 6,734,829 | B1 | 5/2004 | Gottl | |
| 7,015,871 | B2 * | 3/2006 | Gottl et al. | 343/882 |
| 7,283,085 | B2 | 10/2007 | Lee et al. | |
| 7,286,094 | B2 | 10/2007 | Ratni et al. | |
| 7,295,960 | B2 * | 11/2007 | Rappaport et al. | 703/13 |
| 7,365,701 | B2 * | 4/2008 | Werner et al. | 343/909 |
| 7,742,754 | B2 * | 6/2010 | Yahagi | 455/404.2 |
| 7,969,374 | B1 * | 6/2011 | Thommana et al. | 343/755 |
| 2001/0020915 | A1 * | 9/2001 | Proctor, Jr. | 342/372 |

(Continued)

OTHER PUBLICATIONS

V. V. N. S. Polu, B. G. Colpitts, and B. R. Petersen, "Symbol-wavelength MMSE gain in a multi-antenna UWB system," in Proceedings of the 4th Annual Communications Networks and Services Research Conference ( CNSR 2006), vol. 1, (Moncton, NB, Canada), pp. 95-99, May 2006.*

(Continued)

*Primary Examiner* — Marisol Figueroa

(74) *Attorney, Agent, or Firm* — Eugene F. Derényi; Fogler, Rubinoff LLP

(57) ABSTRACT

Method for generating a configuration of elements for a multi-input and multi-output multi-user ("MIMOMU") antenna array system comprising the steps of at least two antennas and at least one electromagnetic signal modifying element; and, applying a genetic algorithm to the antennas to generate an antenna array configuration in which the antennas form an asymmetric array and where the array system is optimized for multi-user performance, and MIMOMU antenna array systems are disclosed.

19 Claims, 41 Drawing Sheets

(56) References Cited

U.S. PATENT DOCUMENTS

| | | | | |
|---|---|---|---|---|
| 2004/0090938 | A1* | 5/2004 | Hsu | 370/335 |
| 2009/0042617 | A1* | 2/2009 | Li et al. | 455/562.1 |
| 2009/0312057 | A1* | 12/2009 | Moon et al. | 455/562.1 |

OTHER PUBLICATIONS

B. Widrow, P. Mantey, L Griffiths, and B. Goode, "Adaptive antenna systems," Proc. IEEE, vol. 55, pp. 2143-2159, Dec. 1967.

J. H. Winters, "Optimum combining in digital mobile radio with cochannel interference," IEEE J. Sel. Areas Commun., vol. 2, pp. 528-539, Jul. 1984.

S. Roy, Space-Time Processing Techniques with Application to Broadband Wireless Systems. PhD thesis, Department of Systems and Computer Engineering, Carleton University, Aug. 2000.

C. S. Bontu, D. D. Falconer, and L. Strawczynski, "Diversity transmission and adaptive MLSE for digital cellular radio," IEEE Trans. on Vehicular Technology, vol. 48, pp. 1488-1502, Sep. 1999.

A. Sayeed and V. Raghavan, "Maximizing MIMO capacity in sparse multipath with reconfigurable antenna arrays," IEEE J. Sel. Topics Signal Process., vol. 1, pp. 156-166, Jun. 2007.

J. Yang and S. Roy, "On joint transmitter and receiver optimization for multiple-input multiple-output (MIMO) transmission systems," IEEE Trans. Commun., vol. 42, pp. 3221-3231, Dec. 1994.

D. Gesbert, M. Shafi, S. Da-shan, P. Smith, and A. Naguib, "From theory to practice: an overview of MIMO space-time coded wireless systems," IEEE J. Sel. Areas Commun., vol. 21, pp. 281-302, Apr. 2003.

G. Zhu, B. R. Petersen, and B. G. Colpitts, "Signalling wavelength in an antenna array for space-time wireless over LOS channels," in Proceedings of the 3rd Annual Communications Networks Services and Research Conference (CNSR 2005), vol. 1, (Halifax, NS, Canada), pp. 69-73, May 2005.

V. V. N. S. Polu, B. G. Colpitts, and B. R. Petersen, "Symbol-wavelength MMSE gain in a multi-antenna UWB system," in Proceedings of the 4th Annual Communications Networks and Services Research Conference (CNSR 2006), vol. 1, (Moncton, NB, Canada), pp. 95-99, May 2006.

H. Yanikomeroglu and E. S. Sousa, "Antenna gain against interference in CDMA macrodiversity systems," IEEE Trans. Commun., vol. 50, pp. 1356-1371, Aug. 2002.

R. Kalbasi, D. D. Falconer, and A. H. Banihashemi, "Optimum space-time processors with symbol-rate sampling are bandlimited," IEEE Trans. Signal Process., vol. 54, May 2006.

M. A. Jensen and J. Wallace, "A review of antennas and propagation for MIMO wireless communications," IEEE Trans. Antennas Propag., vol. 52, Nov. 2004.

P. Jung and P. Alexander, "A unified approach to multiuser detectors for CDMA and their geometrical interpretations," IEEE J. Sel. Areas Commun., vol. 14, pp. 1595-1601, Oct. 1996.

A. Goldsmith, S. A. Jafar, N. Jindal, and S. Vishwanath, "Capacity limits of MIMO channels," IEEE J. Sel. Areas Commun., vol. 21, Jun. 2003.

L. Liu, W. Hong, H. Wang, G. Yang, N. Zhang, H. Zhao, J. Chang, C. Yu, X. Yu, H. Tang, H. Zhu, and L. Tian, "Characterization of line-of-sight MIMO channel for fixed wireless communications," IEEE Antennas Wireless Propag. Lett, vol. 6, pp. 36-39, 2007.

R. Ziegler and J. Cioffi, "A comparison of least squares and gradient equalization for multipath fading in wideband digital mobile radio," in Conf. Rec. IEEE Globecom 89, vol. 1, pp. 102-105, Nov. 1989.

D. Fogel, "Evolutionary computing," IEEE Spectr., vol. 37, pp. 26-32, Feb. 2000.

D. Anastassiou, "Genomic signal processing," IEEE Signal Process. Mag., vol. 18, pp. 8-20, Jul. 2001.

M. Jiang and L. Hanzo, "Multiuser MIMO-OFDM for next-generation wireless systems," Proc. IEEE, vol. 95, pp. 1430-1469, Jul. 2007.

A. J. Viterbi, CDMA: Principles of Spread Spectrum Communication. Reading, MA, USA: Addison-Wesley Publishing Co. Inc., 1995.

A. Soong and W. Krzymien, "Effect of antenna diversity on performance of reference symbol assisted interference cancellation in CDMA wireless systems," in Conf. Rec. 1997 IEEE 6th International Conference on Universal Personal Communications (ICUPC), vol. 1, pp. 202-207, Oct. 1997.

S. Roy and D. D. Falconer, "Multi-user decision-feedback space-time equalization and diversity reception," in Conf. Rec. IEEE International Conference on Vehicular Technology (VTC '99), vol. 1, (Houston, TX, USA), pp. 494-498, May 16-19, 1999.

S. Roy and D. D. Falconer, "Optimum infinite-length MMSE multi-user decision-feedback space-time processing in broadband cellular radio," Wireless Personal Commun., vol. 27, pp. 1-32, Oct. 2003.

T. S. Rappaport, Wireless Communications. Upper Saddle River, New Jersey, USA: Prentice Hall PTR, 2001. pp. 394-395.

G. Cherubini, E. Eleftheriou, and S. Ölçer, "Filtered multitone modulation for very high-speed digital subscriber lines," IEEE J. Sel. Areas Commun., vol. 20, pp. 1016-1028, Jun. 2002.

A. M. Legnain, D. D. Falconer, and A. U. H. Sheikh, "New adaptive combined space-time receiver for multiuser interference rejection in synchronous CDMA systems," in Conf. Rec. Canadian Conference on Electrical and Computer Engineering (CCECE), vol. 1, (Waterloo, ON, Canada), pp. 421-424, May 24-28, 1998.

J. H. Winters, "Upper bounds for the bit error rate of optimum combining in digital mobile radio," in Conf. Rec. IEEE Globecom 84, vol. 1, pp. 173-178, Nov. 1984.

* cited by examiner

JOINT COMMUNICATION AND ELECTROMAGNETIC OPTIMIZATION OF A MULTIPLE-INPUT MULTIPLE-OUTPUT ULTRA WIDEBAND BASE STATION ANTENNA

CROSS REFERENCE TO RELATED APPLICATIONS

This application claims the benefit of U.S. Provisional application Ser. No. 61/099,078 filed Sep. 22, 2008, and U.S. Provisional application Ser. No. 61/008,591 filed Dec. 21, 2007.

FIELD OF THE INVENTION

This invention relates to multi-user antenna in general and methods of configuring antennas in an array in particular.

BACKGROUND OF THE INVENTION

Recent work in the area of wireless communications has shown that when antenna placements in a two-by-two MIMO system are on the order of a symbol wavelength rather than the carrier wavelength, significant improvements can be made with respect to performance. This has given rise to the term of Signaling Wavelength Antenna Placement (SWAP) Gain to describe the advantages. The premise of this finding is that when the antennas are spaced a symbol wavelength apart, the likelihood that the channels are correlated is minimal.

However, determining the optimum placement of the antennas is seen as a highly non-linear problem that depends on the number of antennas in the system, and distribution of the users in the three-dimensional wireless communication space.

MIMO Systems

A MIMO system makes use of multiple antennas to exploit spatial diversity. By placing the antennas some distance apart, the received signals from the same user will appear at each antenna in the system. Since the radio channel in many systems is often impaired by effects such as random noise, multipath interference, co-channel interference (CCI), and adjacent channel interference, the resulting signals at each antenna will be different in terms of the channel impulse response [1], [2]. The noise and interference can be considered to be uncorrelated, while the message signal appearing at each antenna will retain some correlation. However, in cases where the antenna placements are similar, there exists the probability that the noise and interference will be correlated [3], [4], [5].

In general, any M-by-N MIMO system configuration can be modeled as a matrix of channel impulse functions from the $M_{th}$ user to the $N^{th}$ antenna. Typically, a wireless communications system will rely on a large base station that handles the requests from the mobile users in the cell. An example of a mobile user placement and antenna placement configuration of a four-by-four system is shown in FIG. 1.

In the research area of wireless communications, current generation systems are constantly being improved upon, with the advances becoming part of the next generation of standards. MIMO systems make use of multiple antennas to achieve spatial diversity and high performance [6], [7]. Recent work in the area of wireless communications has shown that when antenna placements in a two-by-two MIMO system are on the order of a symbol wavelength ([speed of light]/[symbol rate]), rather than the carrier wavelength, significant improvements can be made with respect to multiuser performance [8], [9], [10]. This has given rise to the term Signaling Wavelength Antenna Placement (SWAP) Gain to describe the advantages. The premise of this finding is that when the antennas are spaced a symbol wavelength, or more, the likelihood that the bits are correlated is minimal and the array receives more information. When used in conjunction with an ultra wideband (UWB) spectrum, the communication system holds the potential of delivering high-speed data services to many users [9], [11].

Much of the MIMO work to date relies heavily on assuming a randomized multipath rich environment to realize the maximum gains from spatial diversity [6], [12]. The fading characteristics are often modelled as Rayleigh distributions. However, in close range indoor situations, the Line of Signal (LOS) can often dominate the multipath components (modelled as Ricean distributions), minimizing the prospective gains from MIMO techniques. It is therefore necessary to examine MIMO performance in LOS situations.

Currently, the problem associated with effective MIMO UWB base station antennas is that they are large. The optimization of the MIMO UWB base station antenna is seen as a highly non-linear problem. Therefore, analytically a global optimization is difficult to achieve through traditional methods. An exhaustive trial-and-error method would be able to determine the optimal arrangement, but as the complexity of the system increases, the computational requirements for this method increase exponentially. Also, as wireless systems become ubiquitous, there exists the need to accommodate increasing data rates, but also increasing device numbers [13], [14].

By strategically arranging the antennas in the system to take advantage of the SWAP Gain, an optimal placement exists that will maximize the performance of the MIMO system in an LOS situation [15].

However, determining the optimum placement of antennas and arrangement of reflectors is seen as a highly non-linear computationally difficult problem that depends on the number of antennas in the system, placement and orientation of reflectors, the radio channel bandwidth, the symbol rate, fading, and the distribution of the users in the wireless communication cell [16], [1]. GA optimization has seen success in many non-linear applications, but often the results from these optimizations need interpretation [17], [18], [19]. The algorithm can converge to a local maxima/minima point rather than reach a global solution. The presence of these vestigial structures can prove to be a problem when attempting to gain information from the results. In such cases, it is important to evaluate the results in comparison to a known upper bound to give an indication on how well the GA optimization is performing.

Spread Spectrum Techniques

In code division multiple access (CDMA) systems, such as the Evolution-Data Optimized (EVDO) standard and direct sequence ultra wideband (DS-UWB), multiple users are multiplexed and transmitted over the same channel by using K-length pseudo random noise maximum length binary sequences, where K is the spreading factor [20], [21]. The resulting signal from a single user is thus increased in bandwidth by a factor of K. The summation of the signals from the total users produces an orthogonal signal set such that the original users signal can be de-multiplexed from the resultant signal by using the same generating code on the receive end of the channel [22], [23].

Some of the disadvantages of CDMA schemes are that they are affected more by multiple access interference (MAI) and intersymbol interference (ISI) [13]. To allow for this, a spreading factor greater than the expected capacity is used, resulting in a greater grade of service (GOS) at the expense of more bandwidth.

Symbol Wavelength

The symbol wavelength, λT, is defined as $$\lambda_T = \frac{c}{f_T}, \quad \text{(Eq. 1)}$$

where c is the speed of light and $f_T$ is the symbol rate. It has been shown by Yanikomeroglu et al. [8], [10] that by placing antennas on the order of a chiplength that a greater diversity gain is achieved as opposed to traditional carrier wavelength spacing. For purposes of comparison, the antenna separations in the GA optimization simulation have been normalized with respect to the symbol wavelength.

Radio Channel

The mobile radio channel is inherently noisy and cluttered with interference from other mobiles and multipath reflections. The overall performance of a wireless communication system is concerned with the multiple ways to improve the signal-to-interference-plus-noise Ratio (SINR). In 1948, Shannon demonstrated that through proper encoding in certain conditions, errors can be reduced to any desired level without sacrificing the rate of information transfer [24]. This led to what is known as Shannon's channel capacity formula given by $$C = B\log_2\left(1 + \frac{S}{N}\right), \quad \text{(Eq. 2)}$$

where C is the channel capacity (bits per second), B is the transmission bandwidth (Hz), S is the signal power (W), and N is the noise power (W).

LMS Adaptive Filter

The least mean square (LMS) adaptive filter is another proven concept that has shown great performance and widespread use due to its robustness and ease of implementation [16], [25], [26]. The basic setup of an LMS adaptive filter is shown in FIG. 2.

In this arrangement, the data stream to be transmitted is given by $d_n$, a denotes the spreading code applied to the data, b represents the wireless channel response, $\eta_n$ is the Additive White Gaussian Noise (AWGN), $r_n$ is the signal received at the antenna, $W_n$ is the adaptive filter coefficient, $d'_n$ is the filtered received signal, $e_n$ is the error associated with the filtered received signal, and n is the discrete-time index.

During training, the receiver knows $d_n$, as the training sequence would be programmed into the adaptive filter logic. It will then update the filter coefficient $W_n$ according to $$W_{n+1} = W_n + \mu e_n r_n \quad \text{(Eq. 3)}$$

where $W_{n+1}$ is the updated filter coefficient, $W_n$ is the current filter coefficient, and μ is the LMS adaptation constant, which is chosen to be small enough such that the filter will converge. If μ is chosen to be too large, the adaptation will diverge and the minimum mean square error (MMSE) will not be reached.

After the filter has finished processing the training sequence, the filter then switches from operating on the training sequence and continues to adapt from the incoming signal. Ideally at this point the adaptive filter has converged and has successfully performed the channel inversion to create a matched filter and remains at the global minimum rather than diverging off to some other local minimum. Generalizing this scalar example to vectors leads to the usual form $$W_{n+1} = W_n + \mu e_n r_n \quad \text{(Eq. 4)}$$

where $W_{n+1}$ is vector of the updated filter coefficients, $W_n$, is a vector of the current filter coefficients, μ is the LMS adaptation constant, $e_n$ is a vector of the error associated with the filtered receive signal, and $r_n$ is a vector of the signals received at the antenna.

Genetic Algorithms

GA optimization borrows on the ideas of evolution found in the everyday biology of living organisms. First discussed in Charles Darwin's Origin of Species, the concept is that every living organism that exists today is a result of a process of evolution over the many generations that the population has existed for over great lengths of time. Within every cell of an organism, a genetic blueprint is contained within a chemical substance called deoxyribonucleic acid (DNA). This chemical substance is in a double-helical structure and contains continuous base pairs of the nucleotides adenine (A), thymine (T), guanine (G) and cytosine (C). The sequencing of these nucleotides provides the basic genetic code that is capable of completely reproducing the organism in which the DNA is contained [17], [18]. Thus, the term DNA becomes synonymous with the minimum number of describing features that is required to fully recreate an individual or organism.

Translating this to science and engineering problems, a set of possible solutions becomes the population of living organisms. This population is then evaluated to determine their fitness to performing the desired goal defined in the problem. Such as in nature, the individuals are then subjected to a survival of the fittest evaluation, where only a portion of the top performing individuals are retained for the next generation. These top performing individuals are also chosen to be the parents for the succeeding population. These parents then generate offspring to fill the population. The offspring are generated in primarily two mechanisms, through crossover and mutation.

One of the advantages of GAs is that they are capable of operating on a problem that has a very large set of possible solutions [17], [19]. A problem with a large set of solutions may not be computationally practical to investigate through "brute force" methods. This leads to the advantage that genetic algorithms will often lead to solutions that would otherwise not have been reached through common numerical techniques.

SUMMARY OF THE INVENTION

This invention teaches a high-performing antenna that is compact and easier to implement in a practical environment. A joint communication and electromagnetic optimization of a MIMO UWB base station antenna is achieved by implementing a two-dimensional (2-D) design in an LOS situation to optimize antenna placements, and designing in three-dimensions (3-D) that will make use of reflectors to increase the apparent electromagnetic and communication size of the antenna, and exploiting the advantages gained by using symbol-wavelength spacing.

According to one embodiment, the present invention relates to a method for generating a configuration of elements for a multi-input and multi-output multi-user antenna array system comprising the steps of selecting elements from the group consisting of at least two antennas and, at least one antenna and at least one electromagnetic signal modifying element; and applying a genetic algorithm to the antennas to generate an antenna array configuration in which the antennas form an asymmetric array and where the array system is optimized for multi-user performance.

According to another embodiment, the present invention relates to a multi-input and multi-output multi-user antenna array system comprising an asymmetric array of antennas optimized for multi-user performance.

According to another embodiment, the present invention relates to a method configuration or placement of antennas in an array for a given placement of users in a space. Antennas which can be placed include omni-directional, monopole, dipole, and microstrip antennas.

According to another embodiment, the present invention relates to a method for determining the optimum MIMO performance using omni-directional antennas in an array over LOS radio channels through genetic algorithm optimization.

In one embodiment, the MIMO system has been restricted to 2-D space and only optimizes the placement of the antennas through a genetic algorithm by evaluating the LOS signal.

In another embodiment, the design space for the antenna placement and user placement is extended to 3-D space.

In yet another embodiment, reflector elements are incorporated as part of the design to purposely introduce random reflections to create additional multipath components that will be received by the antennas. By adding these reflectors to the system, the MIMO system behaves as a multi-path rich environment in what was previously dominated by the LOS component. The number, placement, size, shape and orientation of these reflectors are determined using a genetic algorithm.

In yet another embodiment, users are placed randomly in the cell to determine the optimum MIMO performance for all placements of users.

In yet another embodiment, radiation patterns are added to the antenna model instead of using the simple omni-directional case.

Other aspects and features of the present invention will become apparent to those ordinarily skilled in the art upon review of the following description of specific embodiments in conjunction with the accompanying drawing figures.

BRIEF DESCRIPTION OF THE DRAWINGS

Embodiments of the present invention will now be described, by way of example only, with reference to the accompanying drawings figures, wherein:

in FIG. 8 and a crossover ratio of 0.5 after 80 generations;

DETAILED DESCRIPTION OF THE INVENTION

Figure 1:
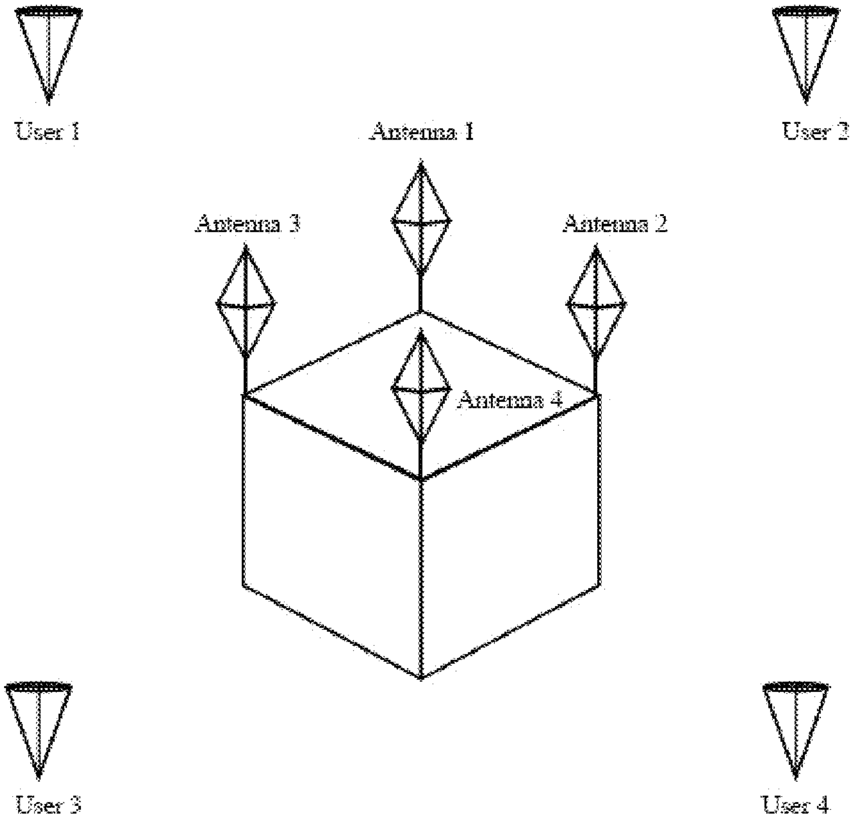
FIG. 1 is a depiction of a four-by-four arrangement for a MIMO system with mobile users placed around the antenna arrangement at the center of the cell.
Figure 2:
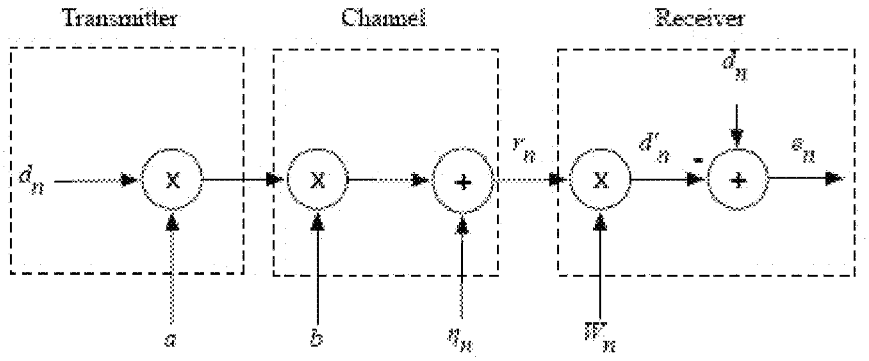
FIG. 2 is a block diagram of the described simple LMS adaptive filter.

In this application, the following definitions are used:

"Optimized" or "optimization"—When antenna arrays and antenna array systems and elements thereof according to the present invention are referred to herein as having been optimized or having had an optimization applied to it, it will be understood by those skilled in the art that optimized or optimization is not limited to a maximum optimization and can include improvements of varying degrees over prior art apparatus, systems and methods.

System Level Components

"Network transceiver unit"—A functional unit of the MIMO multi-user network system, receiving radio signals transmitted from the users (mobiles) in the service area, and transmitting radio signals to these users (mobiles). It may include an antenna array and a cluster of objects that can randomize the radio channels from the users to the antenna array. These objects can be refractors, reflectors, scatterers, and diffractors.

"Data Processing unit(s)"—Electronic device(s) extract data sent by the users (mobiles) from the radio signals received by the network transceiver, and encode data from the network side, so that the transceiver unit can send them over the radio channel to the users (mobiles).

"Users (mobiles)"—Terminal devices belong to the subscribers of the network that transmit and receive radio signals to and from the network transceiver unit.

Components of the Network Transceiver Unit

"Antenna"—A transducer receives and transmits electromagnetic waves.

"Antenna array"—A group of antennas positioned to form a spatial pattern.

"Reflector"—A geometric object of a chosen material that reflects the incident signal. The reflector can be of disks, sphere, cylinder, parabolic, and any other geometric shapes.

"Refractor"—A geometric object of a chosen material that allows a portion of the incident signal to be transmitted through the object at a new direction that is dependent on the geometry of the object, and the electromagnetic properties (permittivity and permeability) of the medium of the incident signal (usually free space) and the object.

"Scatterer"—A geometric object of a chosen size and surface roughness that redirects (diffuses) the incident signal in all directions.

"Diffractor"—A geometric object of a chosen size and shape that allows a redirection of the incident signal at the edges to propagate towards a region that is normally blocked (shadowing region).

Communication System Design

MIMO Setup

The performance of a certain antenna placement can be evaluated and the genetic algorithm then has a fitness function to base its evolutionary process on. It is possible that the algorithm can converge to a local maxima/minima point rather than reach a global solution. The presence of these vestigial structures can prove to be problematic when attempting to gain information from the results.

For the genetic algorithm optimization simulation, three MIMO systems were chosen as models. This included four-by-three, four-by-four, and four-by-five arrangements. This model configuration was chosen since it would be complex enough to exhibit characteristics of the non-linearities of the problem without being overly computationally complex. In terms of the channel impulse functions, the channel impulse response (CIR), between the users and the base stations, the channel impulse function matrix for the four-by-four system is given by $$h(t)=\begin{pmatrix} h_{11}(t) & h_{12}(t) & h_{13}(t) & h_{14}(t) \\ h_{21}(t) & h_{22}(t) & h_{23}(t) & h_{24}(t) \\ h_{31}(t) & h_{32}(t) & h_{33}(t) & h_{34}(t) \\ h_{41}(t) & h_{42}(t) & h_{43}(t) & h_{44}(t) \end{pmatrix}, \quad \text{(Eq. 5)}$$

which has the corresponding Fourier transform $$H(f)=\begin{pmatrix} H_{11}(f) & H_{12}(f) & H_{13}(f) & H_{14}(f) \\ H_{21}(f) & H_{22}(f) & H_{23}(f) & H_{24}(f) \\ H_{31}(f) & H_{32}(f) & H_{33}(f) & H_{34}(f) \\ H_{41}(f) & H_{42}(f) & H_{43}(f) & H_{44}(f) \end{pmatrix}. \quad \text{(Eq. 6)}$$

Variations of these can be used to model the four-by-three and four-by-five systems.

Signal Generation

For the purpose of the genetic algorithm optimization, a bandwidth spreading factor of K=8 was chosen, where the highest low-pass frequency is K/2T, where T is the symbol period. This was chosen as a compromise between giving the coded signals enough of a spread to be recovered after noise was added to the channel, and the computational complexity associated with increasing the bandwidth of the transmitted signals. The spread spectrum spreading codes were generated randomly with complex values and unit energy.

Radio Channel Modelling

In the described GA optimization, the radio channel was modelled as being a pure LOS radio channel. In a pure LOS radio channel, the aspects of multipath interference and ground effects are ignored. The attenuation of the signal is inversely proportional to the square of the distance. This gives rise to a path loss exponent, n, of 2, and determines the received power by $$P_r(d)=P_r(d_o)\left(\frac{d_o}{d}\right)^n, \quad \text{(Eq. 7)}$$

where $P_r$ is the received power (W), $d_o$ is a reference distance close to the base station (m), and d is the distance from the base station (m). Also, for the purpose of this simulation, the antennas were modelled as omni-directional, meaning the isotropic gain was unity.

The next point to consider is the propagation of the signals is considered to be in free space and is therefore taken as c, the speed of light. This gives rise to a time delay for the propagation from the mobile to the antennas. Using the two points of path loss and time delay, the entries of Eq. 6 can now be expressed as a function of the distance from mobile to the antennas to give $$H_{ij}(f)=M_{ij}e^{j2\pi f T t_{ij}}, \quad \text{(Eq. 8)}$$

where $M_{ij}$ is the resulting attenuation of the signal from the $i^{th}$ mobile to the $j^{th}$ antenna, $t_{ij}$ is the time delay associated with the signal from the $i^{th}$ mobile to the $j^{th}$ antenna, and $f_T$ is the symbol rate, $$f_T=1/T. \quad \text{(Eq. 9)}$$

The sources of interference that arise in this simulation are MAI and AWGN. Complex random noise was generated and added to the received signals at each antenna. The noise variance, $\sigma_n$ was chosen to give a signal-to-noise ratio (SNR) of 40 dB at each antenna.

Signal Extraction

Figure 3:
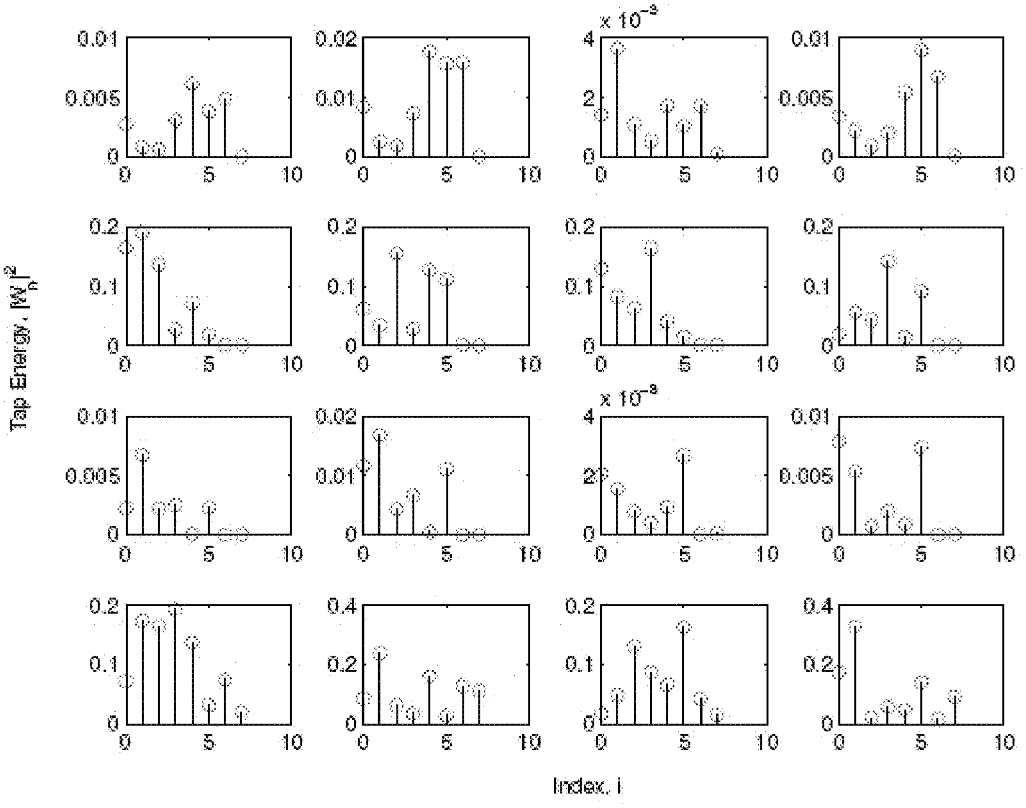
FIG. 3 is a graph showing the LMS adaptive filter coefficients, Wn, in terms of tap energy, versus the coefficient index, in a four-by-four MIMO system, for each user to antenna channel.

The LMS adaptive filter was applied to each received signal at each antenna to extract the original data stream. The LMS adaptation constant, μ, was set to 2-5. For the purpose of this simulation, the entire length of the data stream was considered known, and the adaptive filter was allowed to train on the whole data sequence. The LMS adaptive filter is thus able to determine the filter coefficients, $W_n$, necessary for the multiuser detection (see FIG. 3) for each user to antenna communication channel.

Figure 4:
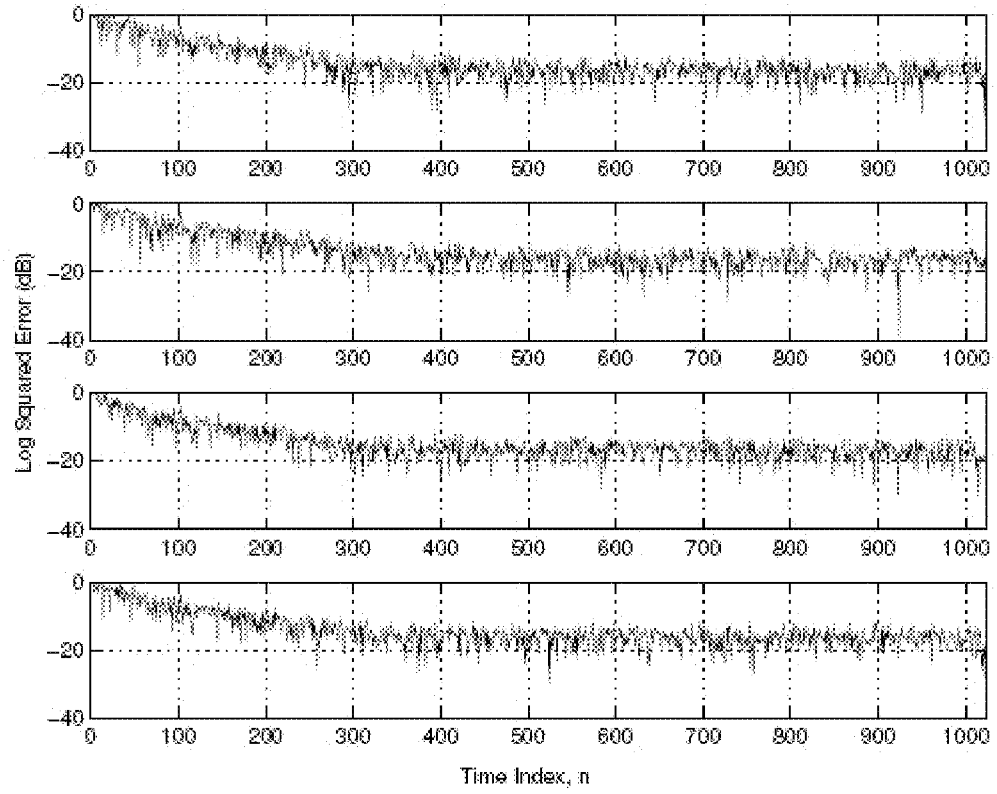
FIG. 4 is a graph showing the learning curves for each user in a four-by-four MIMO system, displayed as log squared error versus time index.

The length of the data sequence was set to be a total of 1024 bits. The adaptive filter was assumed to have converged to the global minimum and the mean squared error (MSE) was then calculated over the second half of the data stream (512 bits). The value for the MSE over the second half of the data stream was taken as the minimum mean squared error (MMSE) value for that user. The ability to detect all users in the system is imperative, thus it is necessary for all users to have converged to a near optimal MMSE value (see FIG. 4). The total performance of all the users is evaluated by averaging the MMSE results. FIG. 4 shows that the filter has nearly converged before 400 bits have been processed. From this observation, the choice of 512 bits is a sound choice and gives reasonable results for the MMSE calculation.

GA Optimization Design

Antenna DNA

In one embodiment of this invention, the simulation comprises choosing the placement of the four antennas as the individual's DNA structure. The antenna placement is evaluated only in two dimensions, so antenna placement contains an x and y co-ordinate describing its placement within the cell. Since each individual is made up of four antenna placements, the individuals of the population can be described by $$DNA_i=\begin{bmatrix} x_1 & y_1 \\ x_2 & y_2 \\ x_3 & y_3 \\ x_4 & y_4 \end{bmatrix}. \quad \text{(Eq. 10)}$$

This could be modified to account for N antennas by simply extending Eq. 10 by adding x and y co-ordinates for each additional antenna up to N. Each element is referred to as an allele of the individual, which in traditional genetics is a sequence of DNA code that is responsible for a particular characteristic in an individual. A constraint was placed on the DNA of the antennas to limit the total distance the antennas were placed from the origin. Specifically, in this simulation, an initial constraint was placed to limit the x and y placement within the range of $(-\lambda_T, \lambda_T)$. This was imposed to simulate some cost function associated with a given antenna placement structure. The total distance also gives a method to quantify an unstable mutation.

Fitness

For each generation of individuals that was created, it was necessary to evaluate the performance of the individuals according to a fitness function, how well the individuals were capable of achieving the specified goal. In a wireless communications system, the goal is ultimately to deliver the information reliably and efficiently. The two most common metrics that measure a systems performance in a wireless communications channel are bit error rate (BER) and the MMSE described in the Signal Extraction section [27]. For each individual of the antenna placement population, four MMSE values were determined, one for each user in the population. To obtain a single score for each individual in the population, the fitness function, $\phi$, was given by $$\phi = \frac{1}{\frac{1}{N}\sum_{i=0}^{N} MMSE_i}, \quad \text{(Eq. 11)}$$

where N is the number of users.

Upon calculating $\phi$, the population can then be ranked according to the resulting scores. Since a small MMSE is desired, the best scoring individuals will have a large value for $\phi$.

Generating Populations

In order to evolve, the next generation of individuals needs to inherit the properties of the top performing individuals from the previous generation and attempt to improve upon them. The portion of top performers retained for the succeeding generation was set at 10%. These top performers were chosen as the parents to generate the next population through the techniques of crossover and mutation.

Crossover

Figure 5:
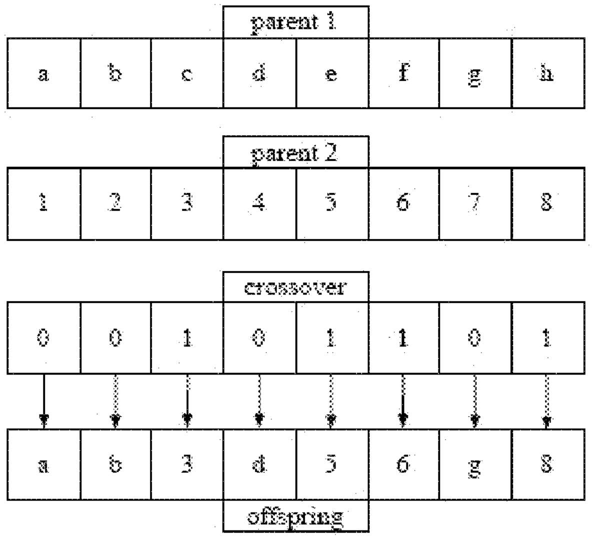
FIG. 5 is a depiction of the crossover process in which a new offspring is created by inheriting attributes from two selected elite parents.

To generate a new individual based on the genetic technique of crossover, two parents are randomly chosen from the top performing population. A binary crossover vector is randomly generated having equal length of the DNA code. The new individual is created by using a combination of the alleles found on in the DNA codes of the two parents. In this case, on the loci (location of allele, or DNA code index) where the crossover vector is a 0, the offspring will inherit the attribute found at the same site as parent 1 (see FIG. 5).

Mutation

The second method by which new individuals are created is through the process of mutation. This method involves adding random perturbations to the genetic code to create new individuals that result from a morphing of the parent. In nature, this process is invoked to increase the available genetic content in a population. The mathematical equivalent to this is to give the population the ability to evolve towards a global optimization rather than remain at some local minima. Often, it is quite possible as well for individuals to be created with similar performance, but vastly different characteristics.

Figure 6:
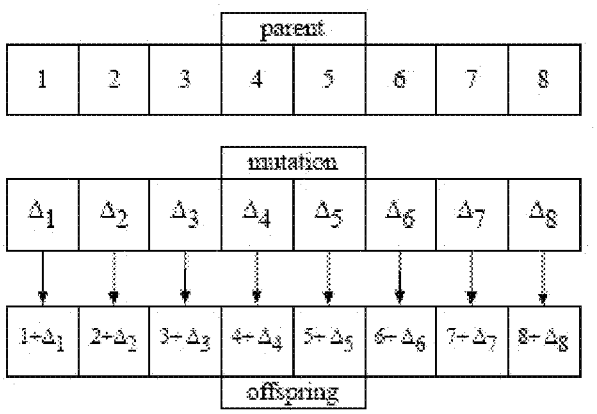
FIG. 6 is a depiction of the mutation process in which a new offspring is created by adding perturbations to the attributes of a randomly selected elite individual.

To generate a new individual via mutation, first, an individual is randomly selected from the top performer population to be mutated. A mutation vector of the same length as the DNA code is then generated by randomly selecting a perturbation from a zero-mean normal distribution. This perturbation vector is then added to the selected parent to create a new individual that is a resultant of the morphed values (see FIG. 6).

The standard deviation of the mutation vector, $\sigma_m$, was given a starting value, $\sigma_{mo}$, and chosen as $0.1\lambda_T$, where $\lambda_T$ is the symbol wavelength. Another characteristic of population genetics is that often when a population is young, it is necessary for the mutations to be large and abundant. As the population evolves, it becomes more specialized and large mutations often appear to provide no further advantages. Also, the value of $\sigma_m$ will determine the variance associated with a population. In order to meet some predefined convergence criteria, it is then necessary for the $\sigma_m$ to decrease as the population becomes more specialized. This gives rise to a degradation factor, $\alpha$, to determine the value of $\sigma_m$ for the next population. The calculation of the $\sigma_m$ is therefore given by $$\sigma_m(\gamma)=\sigma_{mo}\alpha^{\gamma-1} \quad \text{(Eq. 12)}$$

where $\gamma$, is the generation index. A value for $\alpha$ was chosen as 0.97.

Methods

The joint optimization of the base station antenna is carried out through a computer simulation in MATLAB® run on an eight-core Mac Pro computing platform that makes use of the MATLAB® distributed computing engine (MDCE) toolbox to maximize computational throughput for the eight processing cores. Since much of the simulation involves coarse-grained parallel computations, the processor core utilization is very efficient.

Results

Figure 7:
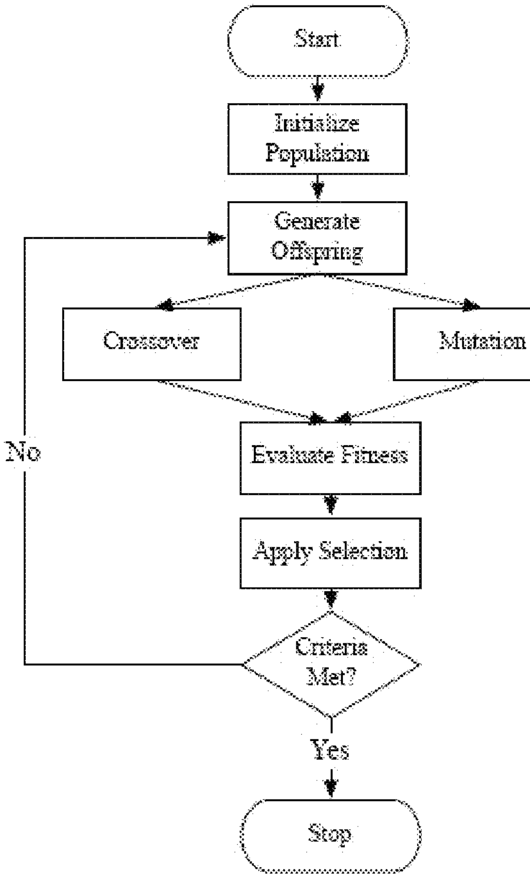
FIG. 7 is a generalized flow chart for the CA optimization process.

The simulation was coded as a MATLAB® script file. Several different user orientations were considered and the output of the optimizations was retained for each generation. For each user orientation, the population size was set to 100 individuals. The number of generations that were simulated was also 100. The selection criterion was retained as the top 10% performing individuals. A crossover ratio of 0.5 was chosen. This meant that 50% of the new individuals that were created were done so by using the crossover technique, while the remaining 50% were generated through mutation. The same parameters were used to evaluate the four-by-three, four-by-four, and four-by-five MIMO configurations. FIG. 7 shows a generalized flow chart for the GA optimization process.

A second run of the simulation was repeated for the same user configurations, but this time choosing a crossover ratio of 0. This meant that the generation of new individuals was done through pure mutation. Similarly, this was also done for the four-by-three, four-by-four, and four-by-five configurations.

Figure 8:
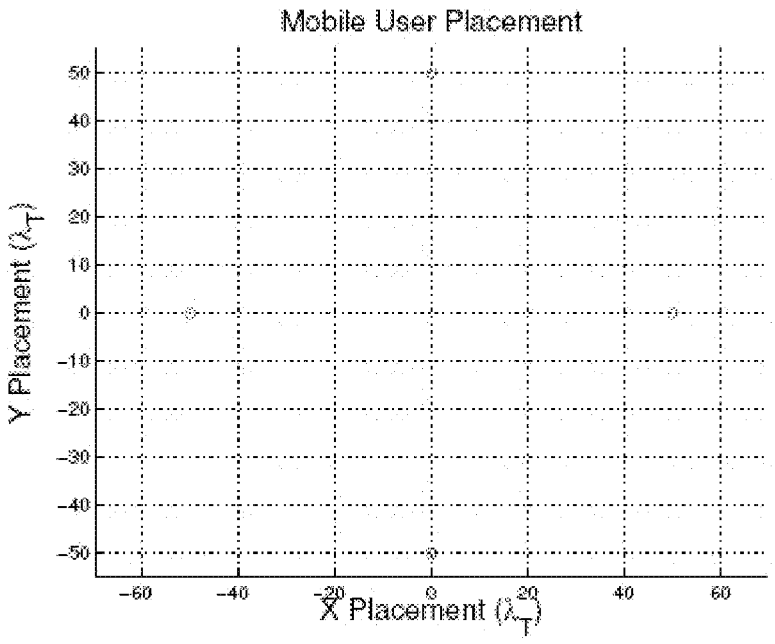
FIG. 8 is a configuration used for the placement of the mobile users in the cell.
Figure 9:
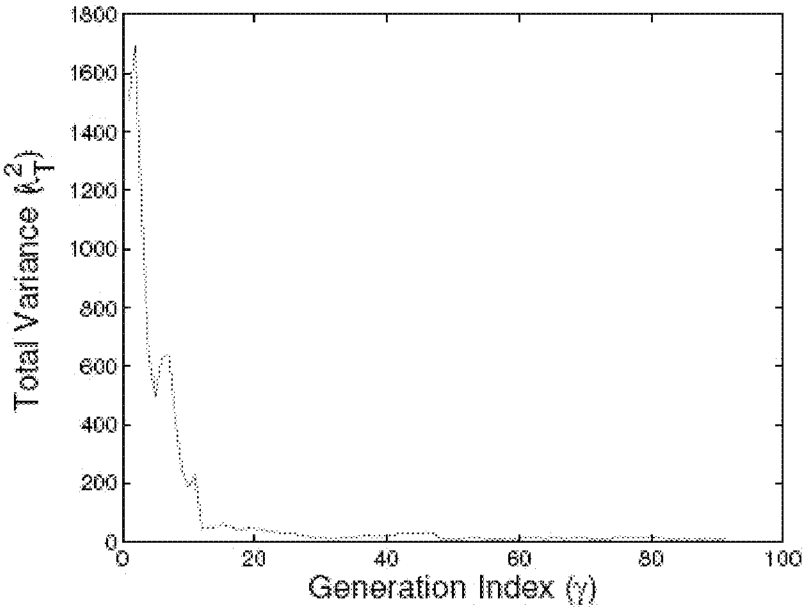
FIG. 9 is a graph showing the total variance of the antenna placements versus the generation index, $\gamma$, in a four-by-three MIMO system using the mobile user placement in FIG. 8 and a crossover ratio of 0.
Figure 10:
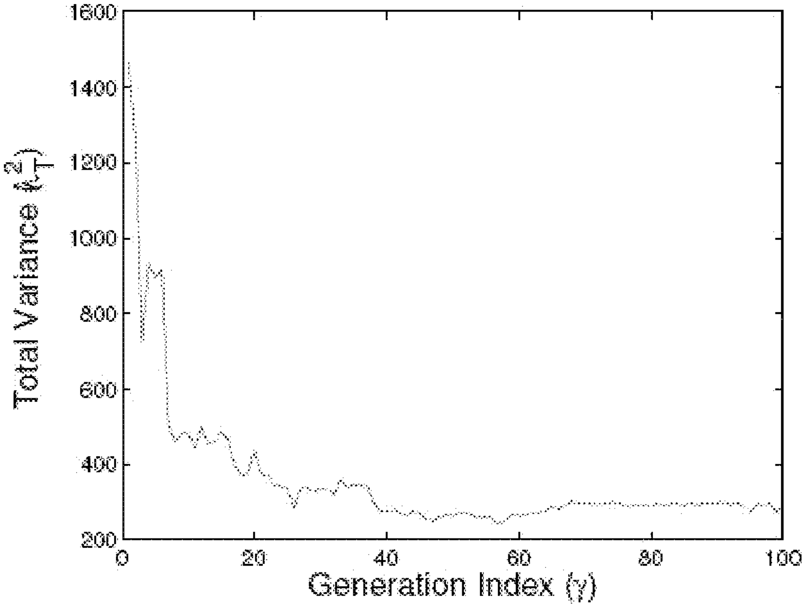
FIG. 10 is a graph showing the total variance of the antenna placements versus the generation index, $\gamma$, in a four-by-three MIMO system using the mobile user placement in FIG. 8 and a crossover ratio of 0.5.
Figure 11:
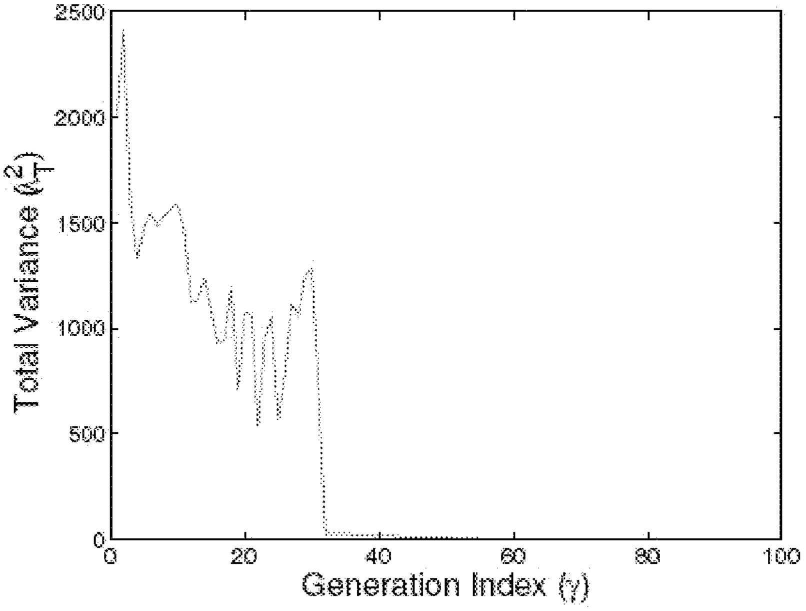
FIG. 11 is a graph showing the total variance of the antenna placements versus the generation index, $\gamma$, in a four-by-four MIMO system using the mobile user placement in FIG. 8 and a crossover ratio of 0.
Figure 12:
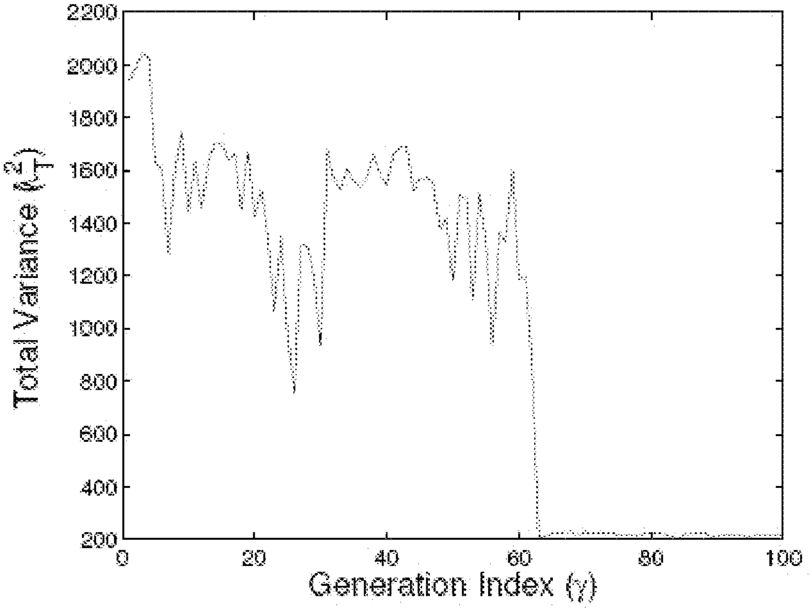
FIG. 12 is a graph showing the total variance of the antenna placements versus the generation index, $\gamma$, in a four-by-four MIMO system using the mobile user placement in FIG. 8 and a crossover ratio of 0.5.
Figure 13:
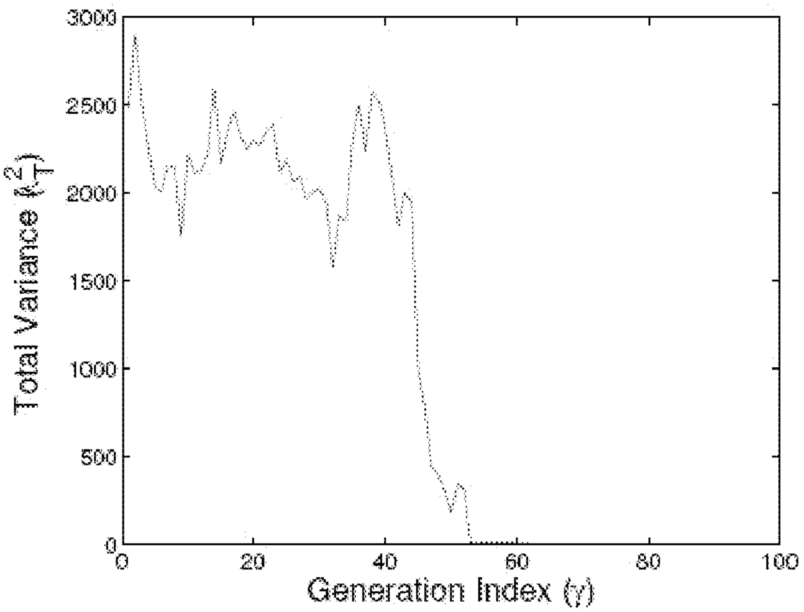
FIG. 13 is a graph showing the total variance of the antenna placements versus the generation index, $\gamma$, in a four-by-five MIMO system using the mobile user placement in FIG. 8 and a crossover ratio of 0.
Figure 14:
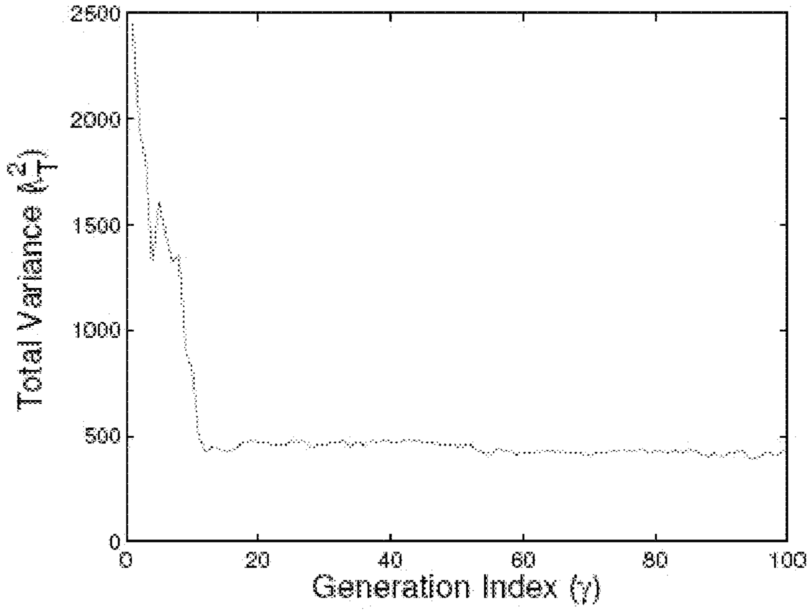
FIG. 14 is a graph showing the total variance of the antenna placements versus the generation index, $\gamma$, in a four-by-five MIMO system using the mobile user placement in FIG. 8 and a crossover ratio of 0.5.

FIG. 8 shows an example of one of the mobile user placements for which the simulation was run. This particular configuration shows the mobile users equally separated around the origin of the cell, each at a radial distance of fifty $\lambda_T$.

To quantify the effectiveness of the GA optimization, the total variance of the antenna placements was evaluated using $$\text{Var}_\gamma = \sum_{k=1}^{n} \text{Var}[\Delta_k(\gamma)], \quad \text{(Eq. 13)}$$

where $\text{Var}_\gamma$ is the total variance of the generation, $\gamma$ is the generation index, n is the number of unique components in the DNA, and $\Delta_k(\gamma)$ is a vector containing all the of the $k^{th}$ components the DNA in the generation $\gamma$ (see FIG. 9 through FIG. 14) Once this value reached steady-state, it is assumed that the optimization has converged. The number of generations was fixed at 100 for this simulation. This allowed for fine tuning of the final solution in many of the cases, since several of the cases showed a vast improvement in as little as 10 generations.

Figure 15:
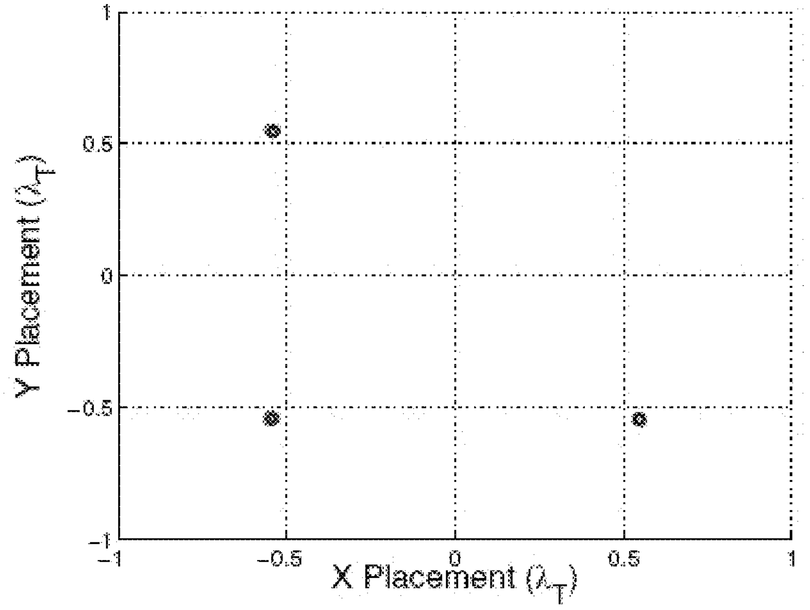
FIG. 15 is a graph showing the antenna placements in a four-by-three system for the top 10% using the mobile user placement in FIG. 8 and a crossover ratio of 0.5 after 100 generations.
Figure 16:
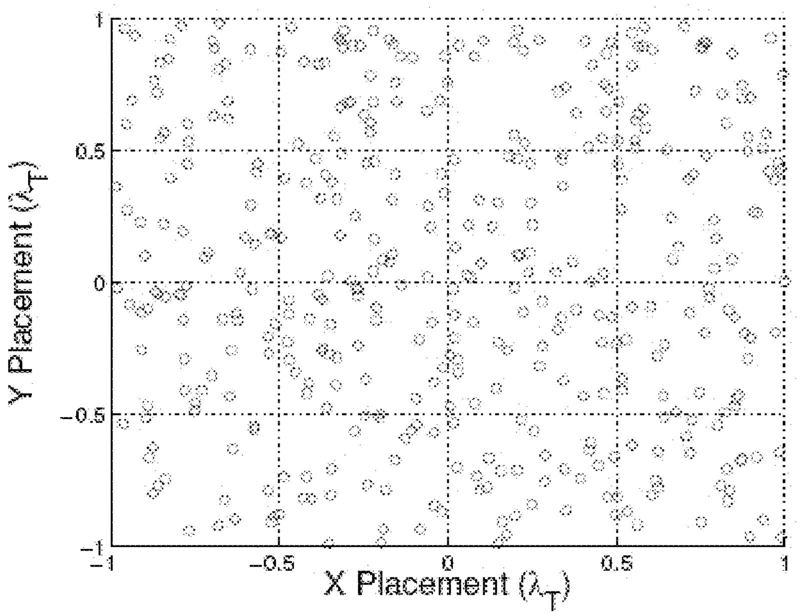
FIG. 16 is a graph showing all antenna placements in a four-by-four system using the mobile user placement in FIG. 8 and a crossover ratio of 0.5 after 1 generation.
Figure 17:
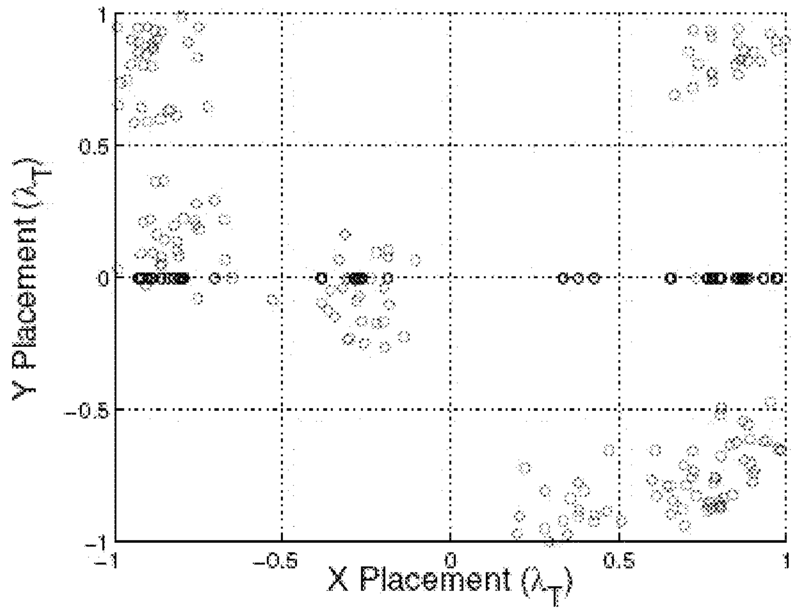
FIG. 17 is a graph showing all antenna placements in a four-by-four system using the mobile user placement in FIG. 8 and a crossover ratio of 0.5 after 5 generations.
Figure 18:
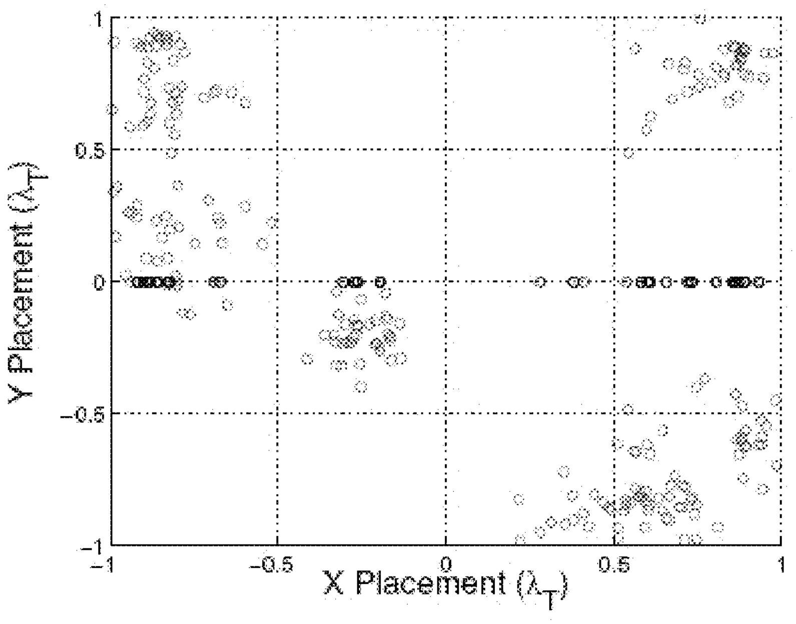
FIG. 18 is a graph showing all antenna placements in a four-by-four system using the mobile user placement, in FIG. 8 and a crossover ratio of 0.5 after 10 generations.
Figure 19:
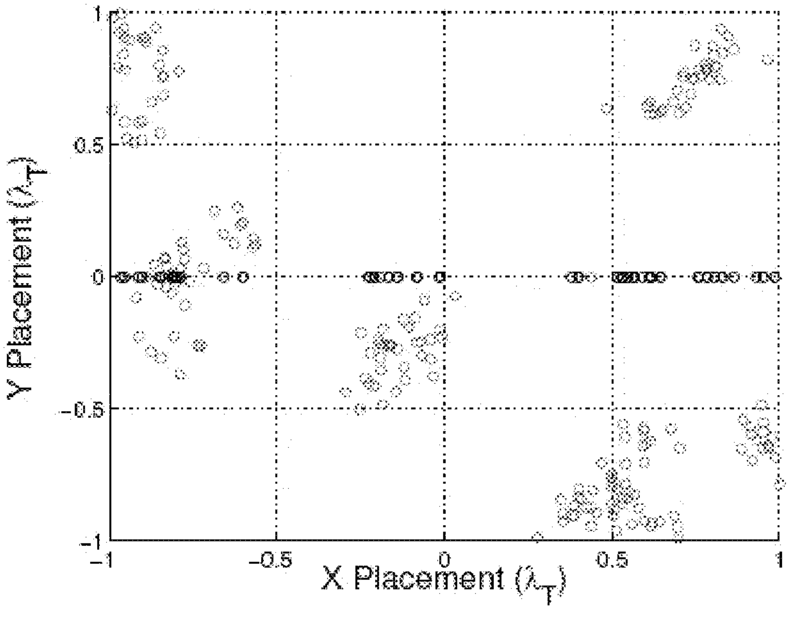
FIG. 19 is a graph showing all antenna placements in a four-by-four system using the mobile user placement in FIG. 8 and a crossover ratio of 0.5 after 20 generations.
Figure 20:
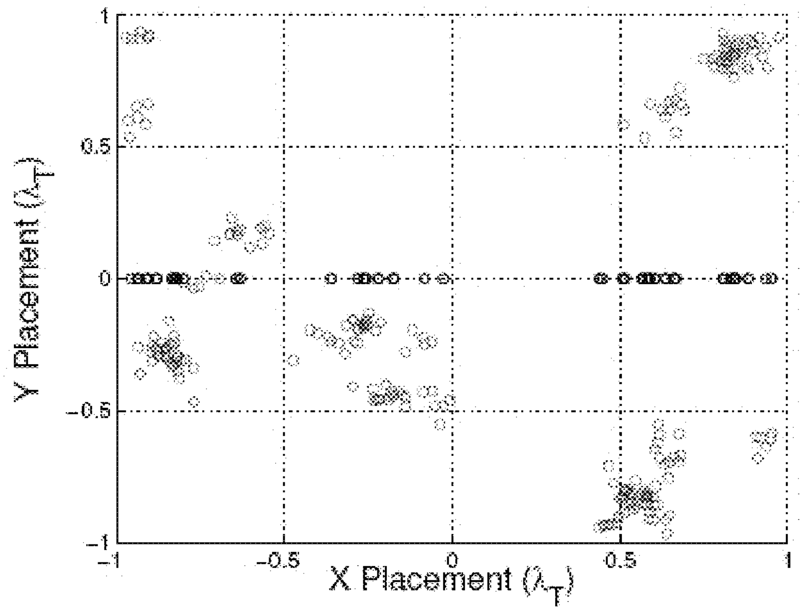
FIG. 20 is a graph showing all antenna placements in a four-by-four system using the mobile user placement in FIG. 8 and a crossover ratio of 0.5 after 30 generations.
Figure 21:
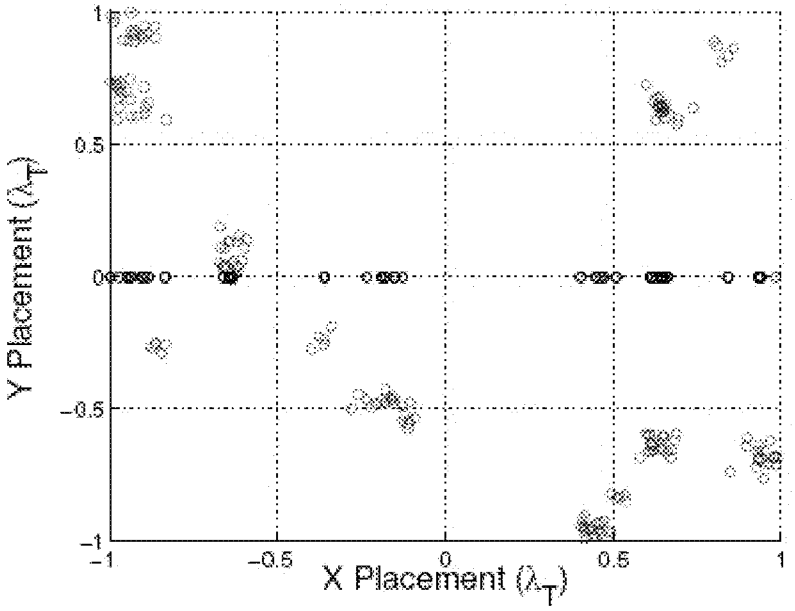
FIG. 21 is a graph showing all antenna placements in a four-by-four system using the mobile user placement in FIG. 8 and a crossover ratio of 0.5 after 40 generations.
Figure 22:
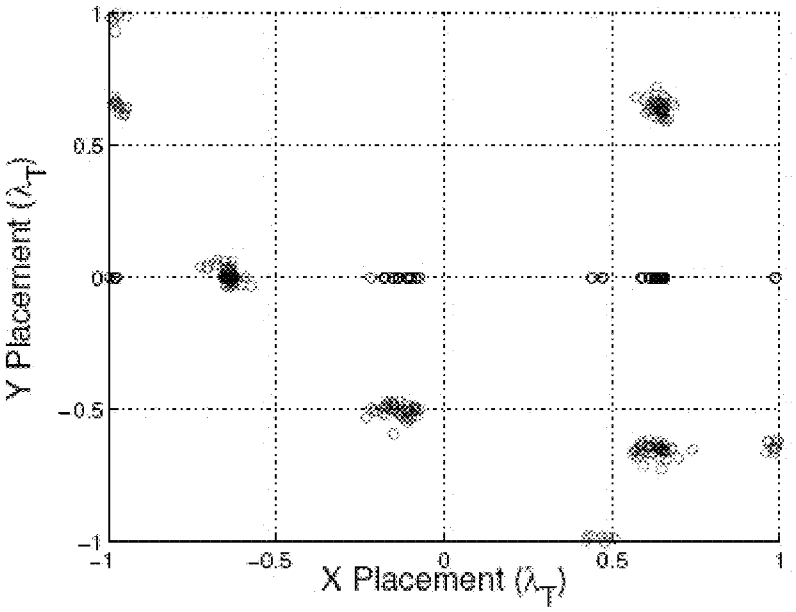
FIG. 22 is a graph showing all antenna placements in a four-by-four system using the mobile user placement in FIG. 8 and a crossover ratio of 0.5 after 50 generations.
Figure 23:
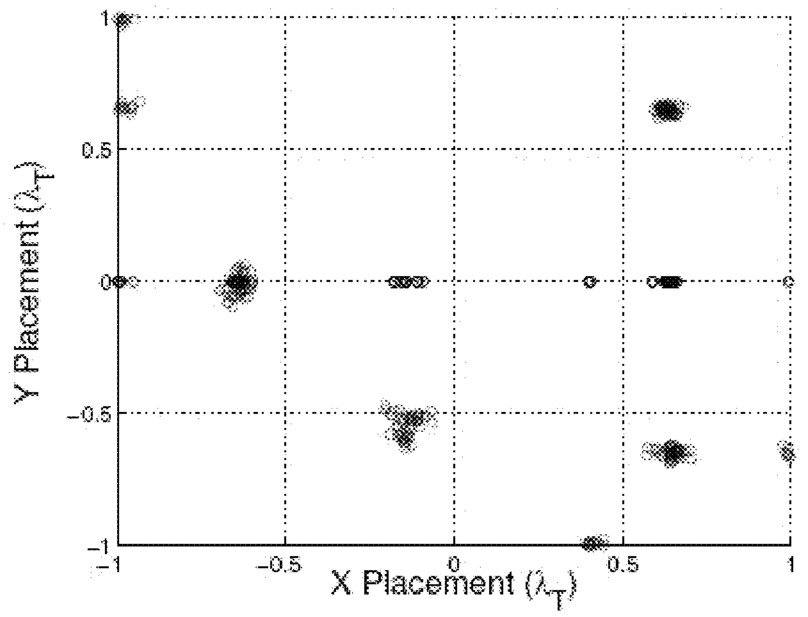
FIG. 23 is a graph showing all antenna placements in a four-by-four system using the mobile user placement in FIG. 8 and a crossover ratio of 0.5 after 60 generations.
Figure 24:
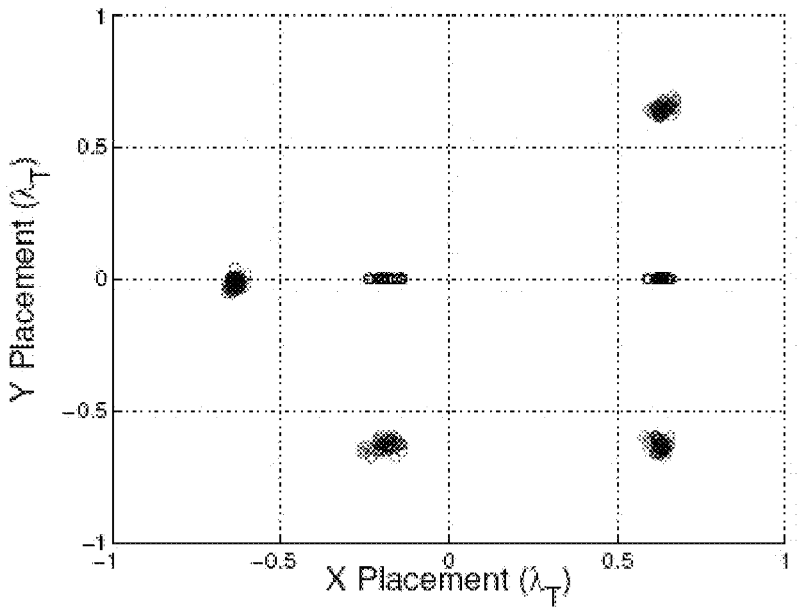
FIG. 24 is a graph showing all antenna placements in a four-by-four system using the mobile user placement in FIG. 8 and a crossover ratio of 0.5 after 70 generations.
Figure 25:
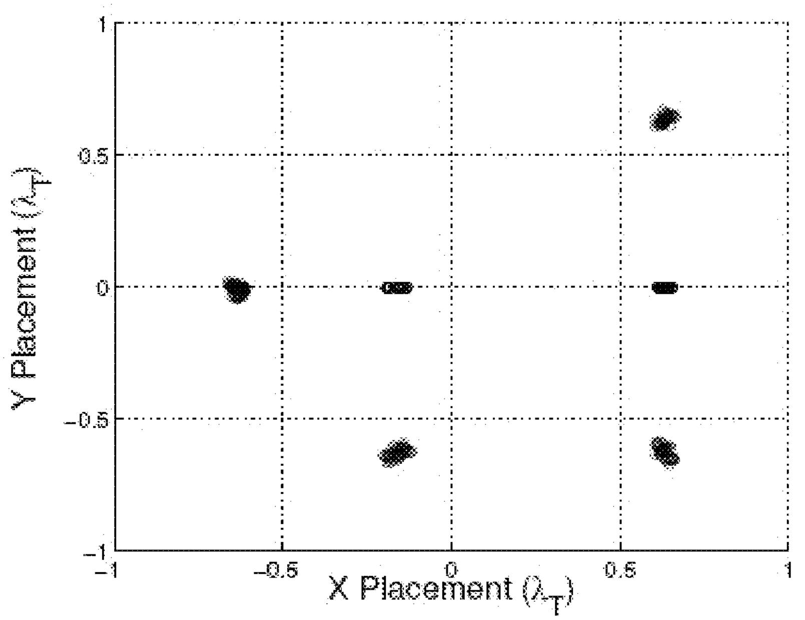
FIG. 25 is a graph showing all antenna placements in a four-by-four system using the mobile user placement.
Figure 26:
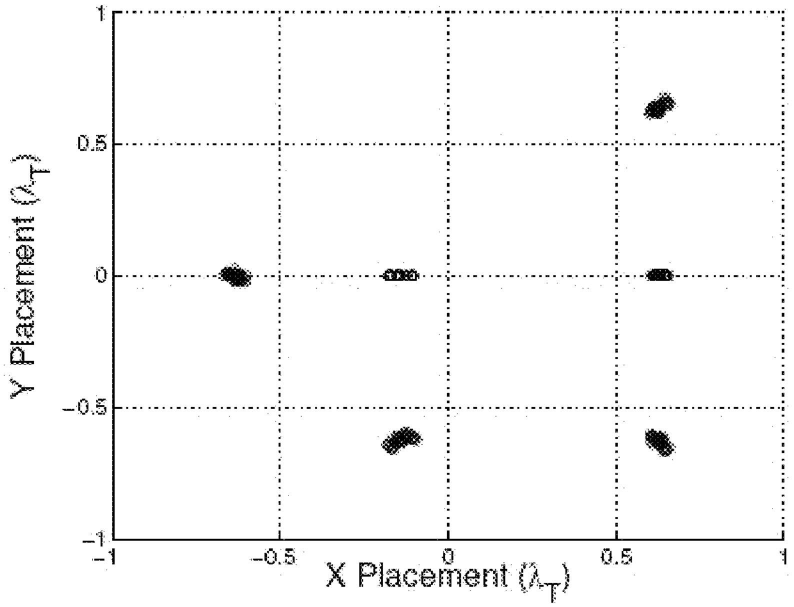
FIG. 26 is a graph showing all antenna placements in a four-by-four system using the mobile user placement in FIG. 8 and a crossover ratio of 0.5 after 90 generations.
Figure 27:
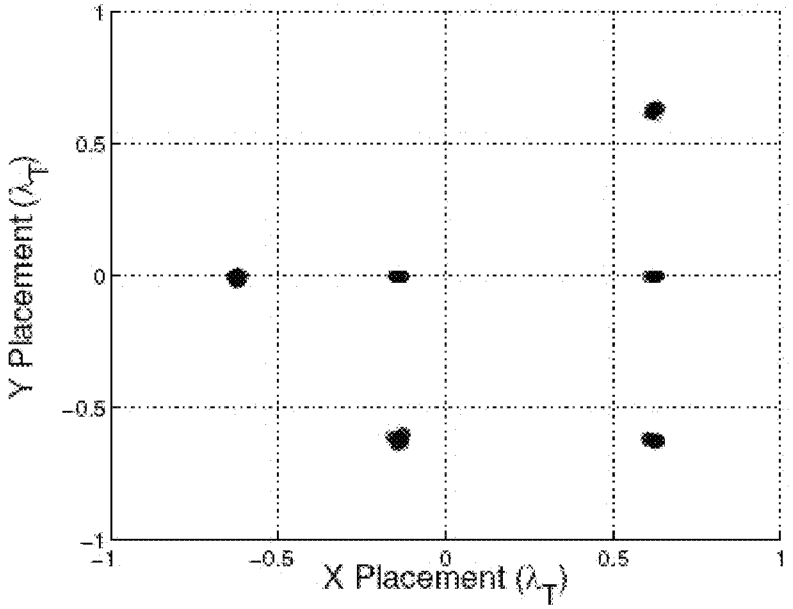
FIG. 27 is a graph showing all antenna placements in a four-by-four system using the mobile user placement in FIG. 8 and a crossover ratio of 0.5 after 100 generations.

Using a crossover ratio of 0.5, the results from the four-by-three system using the user arrangement in FIG. 8, the antenna placement moved towards an isosceles right-angled triangle (FIG. 15). The lengths of the equal sides of the triangle are on the order of the symbol wavelength.

FIG. 16 through FIG. 27 show how the GA progresses during the optimization through successive generations. For the purpose of illustration, these figures show the placement of all the antennas rather than the top 10% performing individuals. Many regions for antenna placement are eliminated within the first five to ten generations. This shows the rapid beginning of the optimization within the first few generations, but also illustrates the need for further successive generations for fine tuning.

Figure 28:
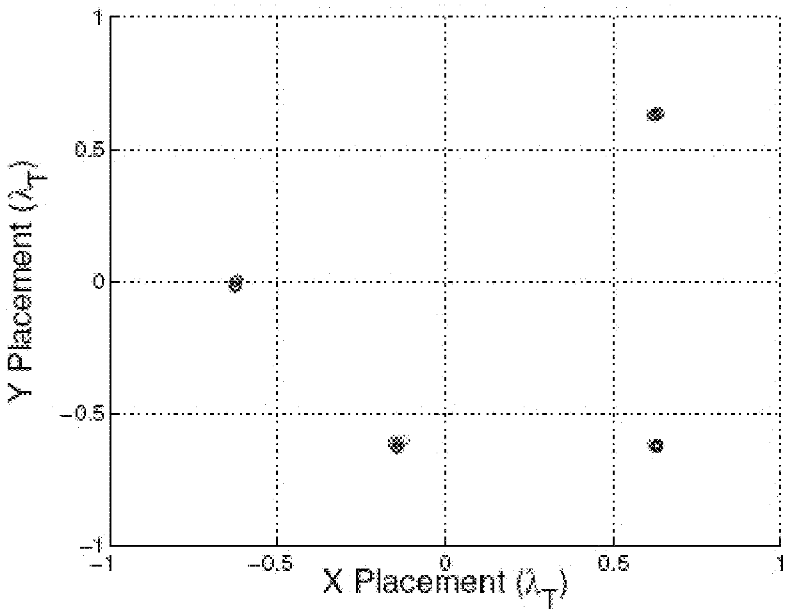
FIG. 28 is a graph showing antenna placements in a four-by-four system for the top 10% using the mobile user placement in FIG. 8 and a crossover ratio of 0.5 after 100 generations.

For the initial simulation run of the four-by-four system, using a crossover ratio of 0.5, the GA tended towards an arrangement in which at least two antennas are separated by $\lambda_T$ as seen by the mobile users and asymmetry (FIG. 28).

Figure 29:
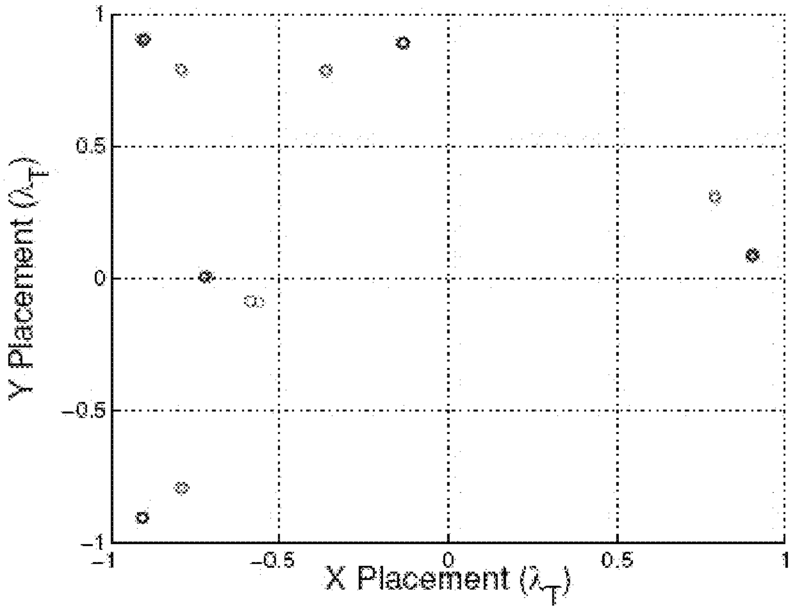
FIG. 29 is a graph showing antenna placements in a four-by-five system for the top 10% using the mobile user placement in FIG. 8 and a crossover ratio of 0.5 after 100 generations.

The results from the simulation for the four-by-five system using a crossover ratio of 0.5 tended towards two distinct configurations (FIG. 29) rather than the single configurations seen in the four-by-three and four-by-four simulations. While distinct, the two configurations are closely related. The four-by-five configurations show similar characteristics to those found in the four-by-four configurations. In this case, the minimum antenna separation is close to a symbol wavelength, while the maximum antenna separation is close to two symbol wavelengths.

Figure 30:
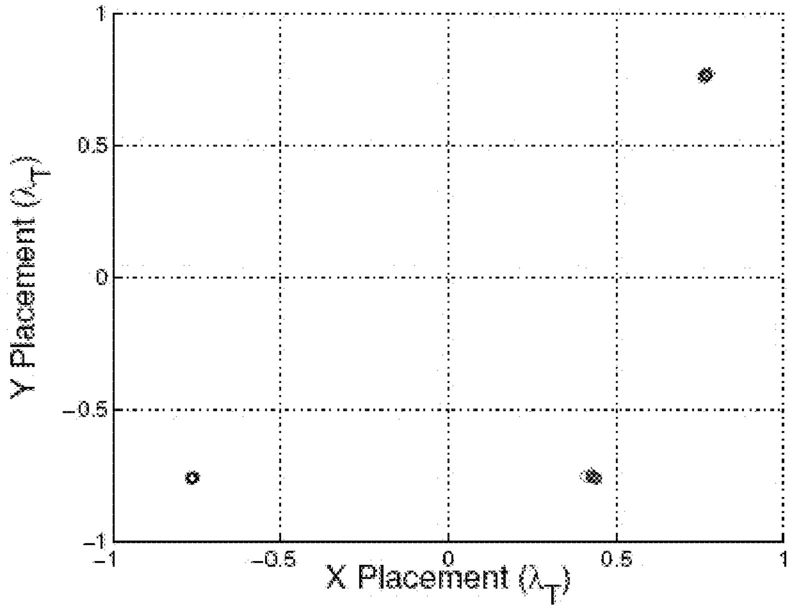
FIG. 30 is a graph showing antenna placements in a four-by-three system for the top 10% using the mobile user placement in FIG. 8 using a crossover ratio of 0 after 100 generations.

The simulations were then repeated for each of the three systems using pure mutation as the method of generating new individuals in the population. FIG. 30 shows that the GA optimization has converged to essentially a single unique antenna arrangement. The triangular configuration has spread further than the minimum of a symbol wavelength, but the maximum antenna separation is still smaller than two symbol wavelengths.

Figure 31:
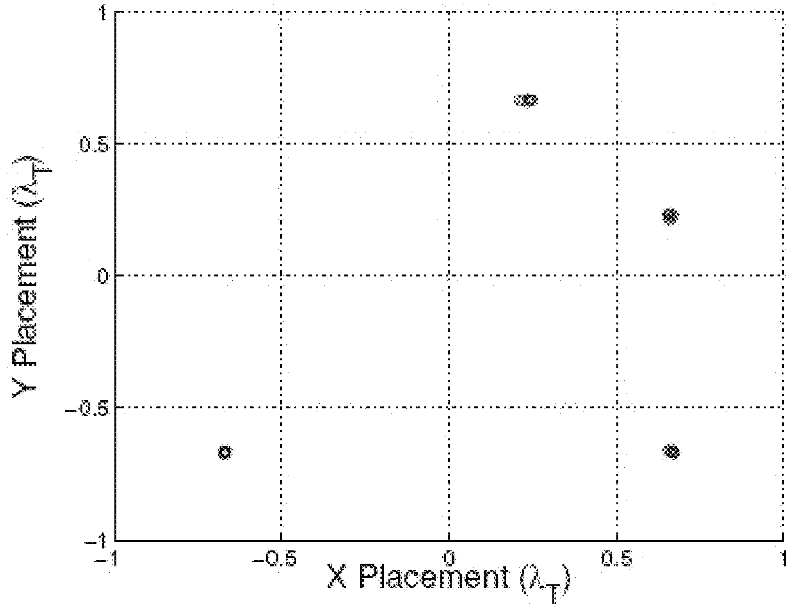
FIG. 31 is a graph showing antenna placements in a four-by-four system for the top 10% using the mobile user placement in FIG. 8 using a crossover ratio of 0 after 100 generations.

For the next simulation run of the four-by-four system, using a crossover ratio of 0, e.g. pure mutation, the genetic algorithm tended towards a different arrangement (FIG. 31). This arrangement also shows asymmetric qualities as well as having at least two antennas separated by $\lambda_T$ as seen by the mobile users. In fact, this arrangement is a 180-degree rotation of the same antenna placement achieved through crossover, which can be considered the same result given the symmetry in the original mobile user placement. This shows that either through pure mutation, or including some degree of crossover, the same results can be achieved.

Figure 32:
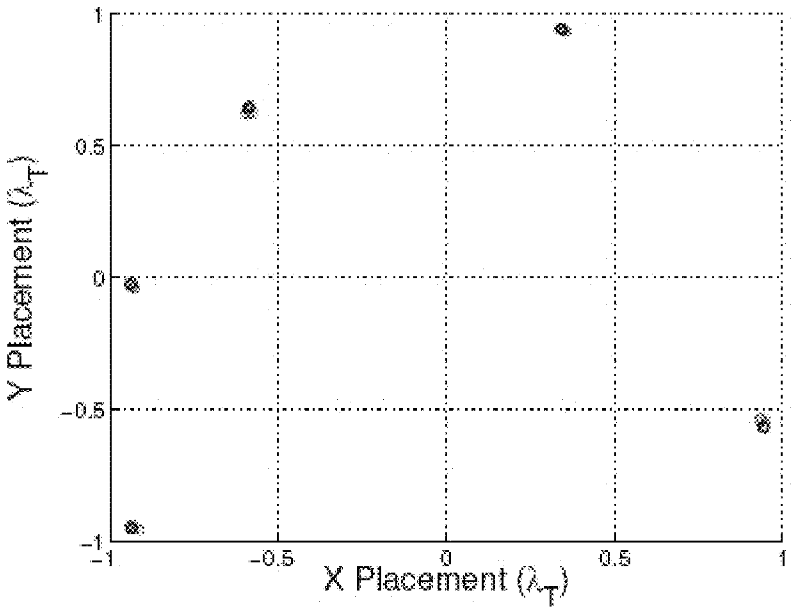
FIG. 32 is a graph showing antenna placements in a four-by-five system for the top 10% using the mobile user placement in FIG. 8 using a crossover ratio of 0 after 100 generations.

Finally, the results of the simulation for the four-by-five system using pure mutation also converge to a single unique solution (FIG. 32). This configuration is close to the two solutions that were found using crossover, however, it is mostly similar to the four-by-four configurations, but with a greater separation of the antennas.

In this arrangement, there exists antenna separations that are closer to two symbol wavelengths in magnitude. The minimum antenna separation seen here is one instance of two antennas being closer than a symbol wavelength.

3-D Expansion

Motivation

The natural progression of the 2-D simulation work is to expand the model to 3-D space. While LOS signals alone can be simplified in the 2-D plane, optimal gains will be made with the addition of reflector elements to increase the multipath present in what was previously a close range LOS situation.

Setup

An M-by-N MIMO system is considered in 3-D space, with the M users placed around the receiver structure in a known configuration. The placement and orientation of reflector and antenna elements is determined by a GA to jointly optimize the received signals based upon the electromagnetic properties of the induced communication channel and the coding scheme used in the transmitted signal.

Reflectors

The reflector elements are modelled as perfect reflectors having a reflection coefficient of unity. More realistic reflection coefficients could be incorporated in the calculations, but to simplify the simulation, a reflection coefficient of unity is used and assumed to have little effect on the overall outcome. This will maximize the gains possible from a multipath environment as well as exploit the SWAP gain.

Initial Placement

The placement of the reflector elements is randomly determined by the GA. They are constrained to a maximum distance from the centre point of the base station to limit the overall size of the receiver structure. Each reflector element will have a 3-D point in space corresponding to the centre point of the reflector itself. Each initial point is determined from a uniform distribution from −1 to 1 and then normalized to the maximum distance from the centre point of the base station that is chosen to constrain the GA.

The orientation of each reflector element is also randomly determined by the GA. Again, choosing from a uniform distribution from −1 to 1, three lengths are chosen for the directions along the x, y, and z axes to create a directional vector. These lengths are then normalized to create a unit directional vector that describes the plane on which the reflector will sit, centred around the origin of the reflector.

Size and Shape

In order to accurately simulate pure planar reflection from the reflectors, the size of the reflector elements must meet a minimum. By making the reflector elements large in comparison relative to the size of the transmitted signal's wavelengths, the effect of diffraction can be minimized. This avoids the more time consuming and intensive process of accurately modelling diffraction. The shape of the reflector elements are chosen as circular discs with a fixed radius. The choice of circular discs makes the most efficient use of reflector material, since this shape provides the most useable surface area with the least amount of area lost to spreading at the edges.

To simplify the calculations and simulation, all reflectors are uniform in size and shape. From a manufacturing standpoint, identical discs would be more easily machined and produced. It would be possible to allow the radius of the reflector surfaces to also be a changeable parameter in the GA. However, having the number of reflector elements as a changeable parameter, the effect of larger reflector sizes can be achieved by combining multiple smaller reflectors to create larger, more complex surfaces.

Growth

To facilitate the growth of the reflector elements, some consideration must be made for the addition (or subtraction) of new reflector elements. An individual in the population would begin with a certain number of reflector elements randomly placed. Through the generation of new individuals, a new parameter would be chosen for the total number of reflector elements present in a single individual.

In order to limit complexity, a maximum would be placed on the total number of reflector elements that a single individual would have. Additionally, pruning would occur that would eliminate reflector elements that did not contribute to the performance gain. This pruning would happen during the ray-tracing stage such that if it is determined that a reflector element receives no signal and does not produce a reflecting signal that is seen by the antennas, it would be eliminated from the population.

Ray-Tracing

For each individual created composed of a random arrangement of reflectors and antennas, the received signals at the antenna due to the induced multipath from the reflectors must be determined. A basic ray-tracing algorithm is implemented. Computationally, this process could be simplified by the use of a vector graphics processor. However, for simplicity, this calculation is processed generically using a general purpose central processing unit.

The CIR is determined in a similar way as in the 2-D case, consisting of the vector sum of received signals at each antenna due to propagation delay and free space path loss. However, the addition of reflectors has the added element of multipath arrivals which must be determined. The entries of the complex passband channel impulse function matrix in Eq. 5 become $$h(t) = \left[\sum_{k=1}^{N} a_k e^{j2\pi f_c T_k} \delta(t - T_k)\right] * w(t), \quad \text{(Eq. 14)}$$

where k is the multipath component index, $a_k$ is the amplitude of the $k^{th}$ multipath component, $f_c$ is the carrier frequency, $T_k$ is the $k^{th}$ associated propagation delay, ★ is the convolution operator, and w(t) is an ideal low pass filter.

The total sum of multipath arrivals that are seen at the antennas is determined by ray-tracing. For each user present in an individual arrangement, directional rays are created from the users' position. Using straight lines, some granularity exists, but by setting a small enough step for degree increments, the total coverage of the ray-tracing is considered sufficient for this simulation.

From each user, based on the degree increment step specified, vectors are created over the range of $\alpha=(-\pi, \pi)$, $\gamma=(-\pi, \pi)$, and $\beta=(-\pi/2, \pi/2)$. Each vector is then used to determine the intersection point with the plane of each reflector or the region around a target antenna.

To determine whether or not the ray has intersected with a reflector plate, the intersection point with the plane of the reflector is found. To do so, the planar equation in the form of $$ax+bx+cz+d=0 \quad \text{(Eq. 15)}$$

is determined, where a, b, c are the x, y, z components of the plane's normal vector, $$n_p=<a,b,c\leq, \quad \text{(Eq. 16)}$$

Eq. 15 can be solved for d using the values of the origin of the reflector for x, y, and z. The point of intersection lies along the ray (line) and can be found by solving for the scalar factor, s, in $$P_{rp}=P_{rorg}+sd_r, \quad \text{(Eq. 17)}$$

where $P_{rp}$ is the point of intersection of the ray and the reflector plate, $P_{rorg}$ is the point of origin of the ray, s is the scaling factor, and $d_r$ is the directional vector of the ray. The scaling factor, s, can is found by combining the line equation and the planar equation yielding $$s = \frac{-d - P_{rorg} \cdot n_p}{d_r \cdot n_p}. \quad \text{(Eq. 18)}$$

Substituting s back into Eq. 17, $P_{rp}$ can be solved for.

Figure 33:
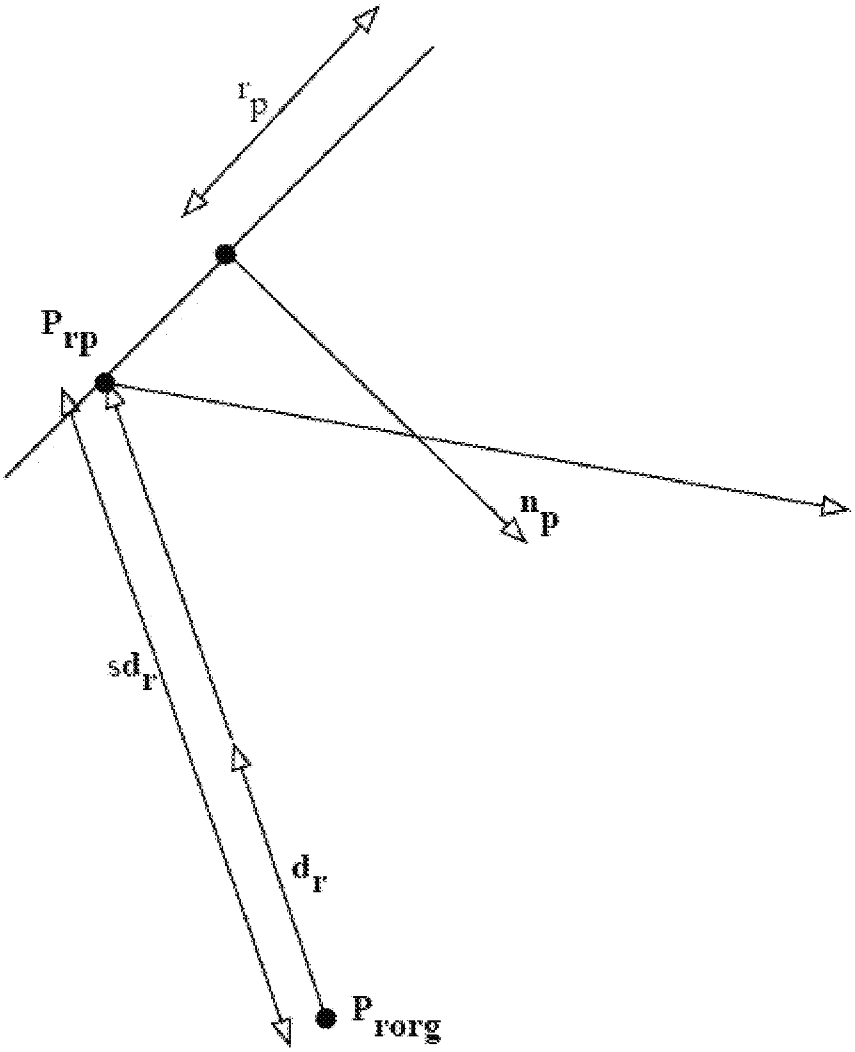
FIG. 33 is a schematic of ray-tracing to determine the intersection point, Prp of a reflector plate and a ray simplified to 2-D.

$P_{rp}$ is then compared to the origin of the reflector. Based on the shape and size of the reflector, it is then determined whether or not the point of intersection from the plane and vector is within the region of the reflector. In the simple case where the reflector is a circular disc with a fixed radius, an intersection of the ray and the reflector is made if the distance from the point of intersection to the origin of the reflector is smaller than the radius. That is $$r_p<\sqrt{(P_{rp}-P_{porg})\cdot(P_{rp}-P_{porg})}, \quad \text{(Eq. 19)}$$

where $r_p$ is the radius of the reflector plate, and $P_{porg}$ is the origin of the reflector plate, provided that the point of intersection is in the outward positive direction of the ray. This is because the general solution will provide a point of intersection along the infinite line of the ray, and the ray begins at a finite point (reflector is behind the ray). Given the assumption that the reflector surface is large compared to the incident wave, the effect of fringing and spreading is ignored and any intersection will be considered a pure reflection (see FIG. 33).

To determine whether or not the ray has intersected the region around the target antennas, the line-sphere intersection method is used. Combining the line equation, $$P_{tint}=P_{rorg}+u(d_r), \quad \text{(Eq. 20)}$$

and the sphere equation, $$(x-x_0)^2+(y-y_0)^2+(z-z_0)^2=r_s^2, \quad \text{(Eq. 21)}$$

yields a quadratic equation of the form $$Au^2+Bu+c=0, \quad \text{(Eq. 22)}$$

where $$A=d_r\cdot d_r,$$

$$B=2d_r\cdot(P_{rorg}-P_{torg}), \quad \text{(Eq. 23 \& Eq. 24)}$$

and $$C=(P_{rorg}-P_{torg})\cdot(P_{rorg}-P_{torg})-r_s^2, \quad \text{(Eq. 25)}$$

$P_{tint}$ is the point of intersection of the ray and the target sphere, u is a scalar, $x_0$, $y_0$, and $z_0$ are the respective points of origin of the sphere, $P_{torg}$, and $r_s$ is the radius of the target sphere.

Solving the quadratic equation yields two solutions, $u_1$ and $u_2$ since the line will intersect the sphere at two points, unless it is tangent to the sphere or makes no intersection at all. Substituting these values into Eq. 20 gives the two points of intersection. The distances, $d_1$ and $d_2$ from the origin of the ray to the points of intersection are $$d_1=\sqrt{P_{tint1}\cdot P_{rorg}}, \quad \text{(Eq. 26)}$$

$$d_2=\sqrt{P_{tint2}\cdot P_{rorg}}. \quad \text{(Eq. 27)}$$

Figure 34:
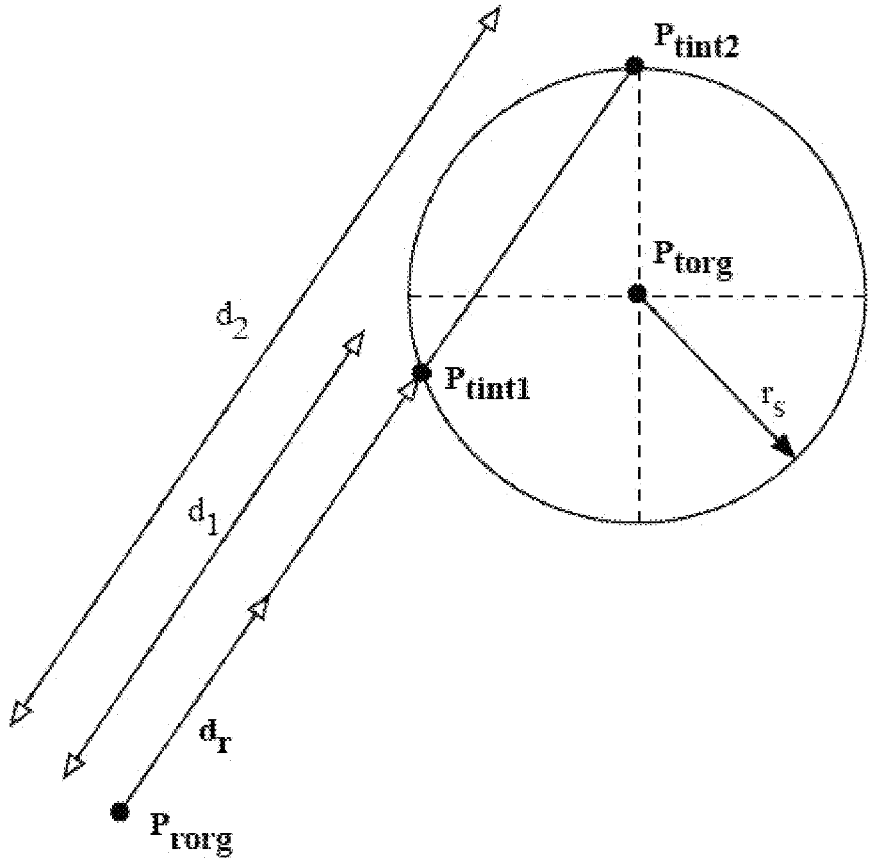
FIG. 34 is a schematic of ray-tracing to determine the intersection points, Ptint1 and Ptint2, of a target spherical antenna and a ray simplified to 2D.

These solutions are considered valid if, like the reflector intersection, the signs of the vector from the ray origin to the point of intersection, that is $P_{tint}-P_{rorg}$, are the same as the directional vector, $d_r$ (see FIG. 34).

If an intersection is made with a target antenna, the ray is terminated if it is determined to be the first intersection that the ray has made with either a target or other reflector. This means that the ray is terminated in this case if it has directly made contact with a target antenna before meeting a reflector.

If a ray is determined to not make contact with either a reflector or an antenna, then it is considered to have not contributed to the received signal at the antenna, and its effects are ignored. Standard GA techniques to sample the surviving individuals were used to maintain genetic diversity by including survivors with a wide range of fitness functions.

If a ray is found to have made an intersection with multiple reflectors, the distance between the reflector and the origin of the incident ray is determined, and the reflector that is the nearer is kept. Any intersection made with reflectors that are further away are ignored, as this would assume that the ray has been transmitted through the reflector, when in actual fact it would be in a shadowing region in which the ray would not be transmitted.

Once an intersection is made with a reflector, the point of intersection becomes the new point of origin for the reflected ray. The reflected ray is then created based upon the incident ray to the reflector. This reflected ray now becomes the new incident ray and is recursively tested for the same intersections of reflectors and antennas.

For all rays that reach the target antenna, the total path traveled becomes the summation of the vectors from the starting position of the user to each intersection points on the reflectors and end antenna. Using this total path, a multipath arrival consisting of a propagation delay and signal level based on free space path loss can be determined.

Channel Impulse Response (CIR)

Once the ray-tracing has been completed, the CIR can be constructed. A single CIR for one user to one antenna will consist of the LOS path (if present) and the total summation of the multipath arrivals that have been induced by the reflectors. For the purpose of simulation, the CIR is most easily computed when described in discrete time. To limit the complexity of the calculations, the maximum bound is placed the length of the CIR both in terms of number of samples, as well as in terms of time.

The number of samples as well as the total delay allowable for the CIR must be chosen in tandem to give an accurate representation of the effects of the multipath without sacrificing computational time. The number of samples must be large enough such that the identification of discrete paths is on the same order as path length differences based on the movement of the reflectors. The length in time of the CIR must be long enough to capture the majority of the energy from the multipath arrivals. This length can be chosen as a multiple of the symbol period to best illustrate the desired effects from symbol wavelength spacing.

GA Optimization Design

The GA optimization design is built upon the 2-D design outlined in the GA Optimization section. The design is expanded to account for propagation in 3-D space, as well as the addition of multipath inducing reflectors.

Flow

Similar to the 2-D design, the basic flow of the GA optimization is as follows. The population is first seeded with individuals that are characterized by their individual DNA. The fitness function is calculated for each of these individuals to determine how well the individual is suited to meeting the specified task. In this case, the optimization is towards multiuser performance, using MMSE as the metric. Once the individuals have been scored, they are ranked and ordered. The top performing individuals are chosen to survive to the next generation, as well as serve as the parents (donors of characteristic DNA) of the next generation.

Next, the new population is generated first with the surviving elite individuals from the previous generation. The remaining individuals are generated using the crossover and mutation methods. As each new individual is created, those who have components that are outside the bounds (antenna or reflector too far from the origin) have those offending components removed and replaced with a newly randomly generated component. This new population then evaluates the fitness scores to once again determine the top performers. This process continues until the end criteria is met. The end criteria can be set as either a number of generations to process, or with a specific performance goal. With the latter case however, it is possible that if the specific performance goal can not be met, the simulation will loop endlessly.

Individual DNA

The characteristics of a single individual configuration is described by the DNA. A single individual in this population is described by the DNA for the antennas and the reflectors. The DNA parameters for the antennas is similar to that of the 2-D situation shown in Eq. 10, except that in this case a z-component is added to the position of the antennas to fully describe it in 3-D space. The number of antennas is fixed in this case at N=4, but similarly could be modified for any N. Therefore, the antenna portion of the DNA becomes $$antennas_i = \begin{bmatrix} x_1 & y_1 & z_1 \\ x_2 & y_2 & z_2 \\ x_3 & y_3 & z_3 \\ x_4 & y_4 & z_4 \end{bmatrix}. \quad \text{(Eq. 28)}$$

A single individual in the population also described by the reflectors surrounding the antennas. The DNA parameters that describe the reflectors are an x-y-z position in 3-D space, as well as a unit directional vector x'-y'-z' describing the orientation of the reflector plate. The shape of the reflector plate is fixed in this case to be a circular disc of a fixed radius, which is constant for all of the reflectors. However, the total number of reflectors, $N_r$, present in one individual configuration is variable, meaning that there is a variation in the size of the reflector portion of the DNA from thus, the reflector portion of the DNA can be represented by $$reflectors_i = \begin{pmatrix} x_1 & y_1 & z_1 & x_1' & y_1' & z_1' \\ x_2 & y_2 & z_2 & x_2' & y_2' & z_2' \\ \vdots & \vdots & \vdots & \vdots & \vdots & \vdots \\ x_{N_r} & y_{N_r} & z_{N_r} & x_{N_r}' & y_{N_r}' & z_{N_r}' \end{pmatrix}.$$

In addition to the antenna and reflector DNA portions described in Eq. 28 and Eq. 29, the parameter describing the total number of reflectors, $N_r$, would also be contained in the DNA of the individual. Although this can easily be derived independently from the information in the reflector DNA, it is included as it is a parameter that is modified when creating new individuals using individual i as a parent.

Generating Populations

For the 3-D simulation, the population is initialized and generated in a similar fashion to the 2-D case as well. The position co-ordinates of the antennas are randomly generated and chosen from a uniform distribution bounded by the distance limits set from the origin of the individual structure.

For the reflectors, the number of reflectors in a given individual are randomly generated from a uniform distribution with a limit on the maximum number of reflectors allowed. The position co-ordinates for each reflector are then chosen from a uniform distribution, as well as the lengths for the directional vector of the reflector surface. The directional vector is then normalized to unit length.

The process of creating a single individual in a population is then repeated until the population limit is reached.

Crossover

Once the initial population has been created and evaluated, the individuals in the successive generation must be created. Mirroring the 2-D case, a new individual is created via crossover by selecting two top performing individuals from the previous generation. The new individual is generated by either inheriting information from one parent or the other from each allele, or loci of information. Since the number of reflectors is also a variable, in the case of the higher number of reflectors being chosen, the new individual will automatically inherit the reflectors from the parent to meet the desired number of reflectors.

Mutation

The second mechanism by which new individuals are created is through mutation. This mirrors the 2-D case as well, by taking a single individual and mutating it by perturbing each parameter by a set standard deviation. Since the number of reflectors is also being perturbed in this case, the elimination of extraneous reflectors is determined randomly using a uniform distribution. In the case in which the number of reflectors needs to be increased, additional reflectors are created and added in the same way as when the population is initialized.

Distributed Processing

Given the high amount of coarse-grained parallelism in the computational requirements of implementing a GA to solve a many configurations of MIMO communication problems, great advantages can be made by incorporating distributed processing to handle these tasks. The calculations required for individuals of a population are not dependent on each other, therefore these lengthy linear computations can be conducted in parallel across multiple processors or nodes.

MDCE

One method of incorporating distributed processing techniques that was explored was through the use of the MDCE toolbox available for MATLAB®. This toolbox includes an array of utilities to implement a distributed processing solution to a set of computational tasks exhibiting parallelism. The MDCE implementation consists of the toolbox set to develop and program the work set, and the engine to run and manage the tasks. This toolbox allows not just for parallel processing across multiple workstations, but exploiting multiple processing units on a single workstation, since MATLAB® itself is currently single-threaded.

Agents

An agent in the MDCE is essentially a full instance of the MATLAB® program capable of interpreting the programs that it is assigned and carrying out the calculations. Each agent must be initialized and named such that it can be properly addressed. A single agent is the processing entity that is capable handling a task. To maximize the utilization of multiple core processors, the ideal number of agents is equal to the number of available processing cores. In a typical distributed computing hierarchy consisting of nodes in a cluster, each node (addressable physical entity) would be assigned a number of agents equal to the number of processing cores available at that node.

Job Manager

The job manager is the program responsible for assigning tasks to the agents and monitoring the exchange of information. A single job manager is required for a single distributed problem, as it oversees the operation of all the agents in a cluster. To maximize the processor core utilization, the best performance will be achieved when a processing core is reserved for the job manager. This eliminates the downtime and queuing delays that would occur if the job manager was forced to share a processing core with an agent.

Jobs

A job in the MDCE is a task that can be assigned to an agent by the job manager. This, in its basic form, is the coarse-grained independent problem that needs to be solved. The job is created by calling the desired method with the appropriate input parameters. It is then assigned an identifier and passed along to the job manager.

At this point, the job manager will take the task and assign it to the first available agent. If an agent is unavailable, the task will be queued and held onto by the job manager. Once the job has been assigned to an agent by the job manager, the job manager will wait on the completion of the operation by the agent. The agent will report back to the job manager with the results, which are then handled by the job manager.

In the implementation of the 3-D GA simulation, the calculation of the fitness function for a single individual exhibits a high amount of coarse-grained parallelism. This means that the calculation of an individuals result has no interdependence on the outcome of another individual when evaluated for the same generation. At the sub-individual level, there is also a choice within the evaluation of a single individual, ray-tracing, that may benefit from distributed process, but the overhead of the distributed setup should be evaluated as it may outweigh the gains at this level.

Ray-Tracing

One of the processes that benefits from distributed processing on the sub-individual level is the ray-tracing portion. Each ray that is generated is exhaustively tracked through either multiple reflections until an intersection with a target is met, or a miss is recorded. This part of the calculation can be done in parallel by making each ray a single job.

Since the calculation of each ray is independent of the other rays from the same source, the evaluation can be carried out in parallel. However, in the simplest case in which no intersections are made, the overhead for parallel job management may be large compared to the evaluation of the ray's intersection with reflectors and targets. At low levels of complexity, i.e. a small number of reflectors and antennas, there may be no benefit seen. At higher levels of complexity, i.e. where the number of reflectors and antennas in the configuration are large, the overhead from the parallel job management becomes proportionately less.

The two main constraints to consider when deciding on the computational complexity that is tolerable is by implementing a maximum number of reflections, $N_{Rmax}$, to calculate as well as a ceiling on the total number of elements (reflectors and antennas), $N_{Emax}$. Since each ray is compared to each element, this represents a total number of $N_{Rmax}$ evaluations for every reflection up to $N_{Emax}$.

MMSE

In the 3-D simulation expansion, the MMSE is evaluated in the same way as in the 2-D case, but with the exception that the input CIR is now more complex, having the addition of reflected multipath components. In relation to the distributed processing, the calculation of the MMSEs for an individual configuration is at the top level of process separation. The next generation is dependent on the information gained from the MMSE calculations, and therefore the simulation cannot advance at this point.

Therefore, as the jobs are completed (MMSE or fitness evaluated) for each individual configuration in the present population, no further calculations are able to proceed at this point.

Since the MMSE calculation is identical to the 2-D case once the CIR has been determined, there should be no increase in the computational requirements for this section, provided the length of the CIR is the same. The approximate computational time by a single processor, discounting parallel overhead, for a generation of 100 individuals in the 2-D case was on the order of a minute, putting a complete simulation of 100 generations close to two hours. By implementing parallel processing to this portion of the GA, the potential benefit is a reduction by a factor of the number of parallel processing units, putting this computation closer to 15 min for a simulation of 100 individuals. However, the increase in number of components in the DNA may require an increase by an order of magnitude in the population size to sufficiently provide the information pool with enough unique information to reach an optimal solution.

Rendez-Vous

A rendez-vous point occurs at the point in which any part of the process is unable to continue without the aid of further information. As jobs are completed and the queue is emptied, there will exist some time in which there is process under-utilization as the jobs meet up at the rendez-vous point. This collective point would be seen in this situation at the points where a distributed task is being completed. If parallel tasking is used for ray-tracing, the program must wait until all rays have been traced before the CIR can be fully constructed. In the case of the MMSE fitness evaluation, all individuals in a population must complete their evaluation before they can be ranked as a group.

In general, at a rendez-vous point, the information from the parallel tasks can be collected and used to proceed with the next portion of the evaluation. Due to the nature of some problems, they are required, but proper problem separation must be used to limit the performance lost during the under-utilization stage.

The findings conducted by implementation in hardware of the antenna/reflector configurations that are determined from the GA optimization can then be verified. Measurements would then be carried out to determine if the simulation was able to accurately predict the multipath arrivals, and therefore if the calculated radio channels were reasonable to use in the simulation to determine the optimal antenna/reflector arrangement.

Designs created traditionally based solely on the predicted contributing elements can also be evaluated in addition to designs created by the GA itself.

EXAMPLE

One example of the MIMO system has three antennas, seven users, and a spread spectrum factor of 3.

First, the antennas of each individual are constrained within a sphere of 2 symbol wavelength (WL), centered at the origin of the coordinate system. Prior to GA adaptation, 100 individuals are randomly generated, i.e. the locations of the antennas randomly generated, subjected to the constraint. Fifty random 7-user locations were also simulated. All the users are located on a circle with 40 WL radius, and 25 WL below the origin (Z coordinates of the users are all −25 WL).

The SINRs obtained by LMS algorithm were used as the fitness function for the GA algorithm. Each generation of GA adaptation, 10 survivors are selected based on a stochastic universal sampling scheme, so as to ensuring the diversity of survived genes and to achieve fast convergence.

Figure 35:
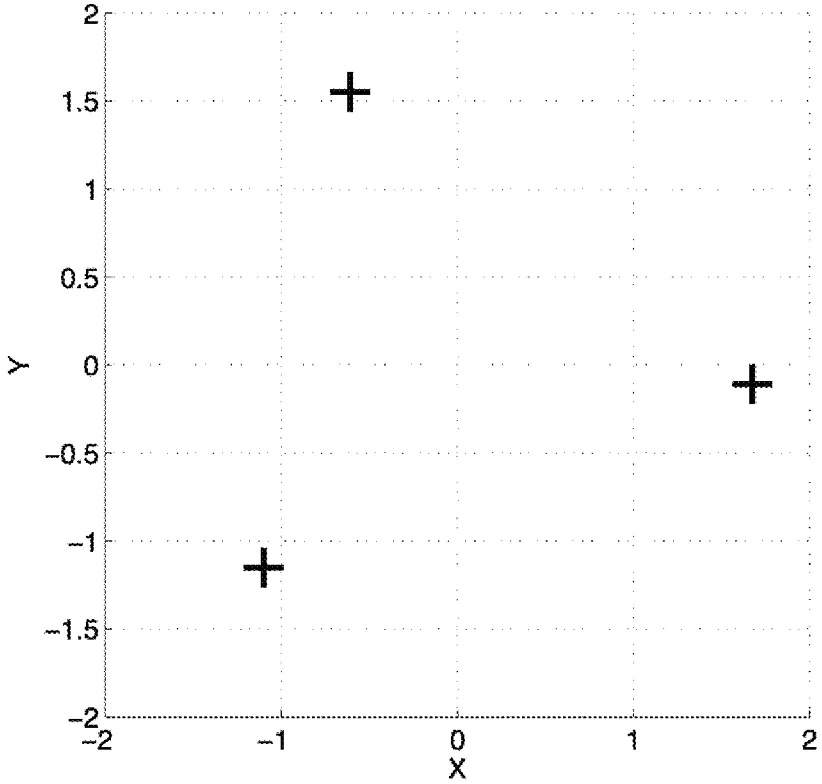
FIG. 35 is a top view of an optimized 3-antenna configuration.
Figure 36:
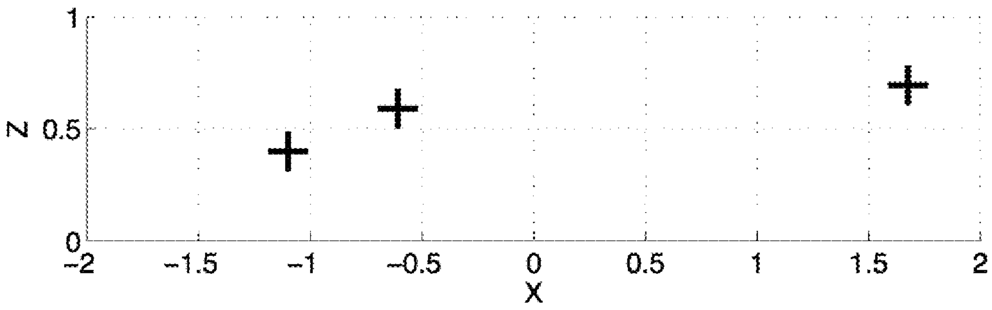
FIG. 36 is a front view of an optimized 3-antenna configuration.
Figure 37:
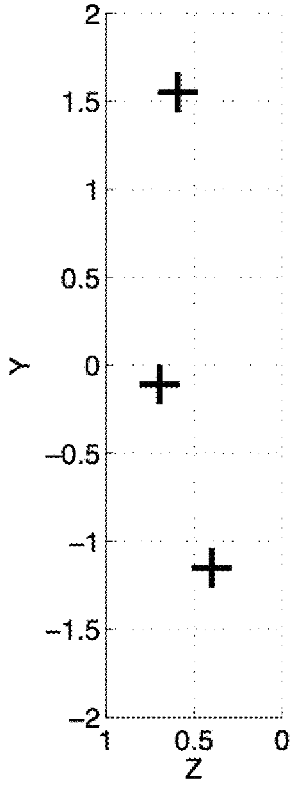
FIG. 37 is a side view of an optimized 3-antenna configuration.

The new population was generated from the 10 survivors with a crossover probability of 25% and an exponentially decaying mutation coefficient. The GA algorithm ran 20 generations, and the best survivor of each generation were tested using a 50 7-user locations, which are different from those used in GA adaptation and called the testing sets. The resulting SINR are plotted in the left plot, with minimum, mean and maximum SINR over the 50 7-user locations. The best survivor of this GA adaptation after 20 generations is presented in FIGS. 35 to 37.

Next, the survivors of the first GA adaptation were used as the starting point for the subsequent work. A new population was generated based on these survivors, by adding 5 reflectors to each individual. The location, size and orientation of each reflector are randomly generated, subject to certain constraints.

Two scenarios are simulated. The first one constraints the range of the reflector within a sphere of 4 WL, and the radius of the reflector within 2 WL; the second one constraints the range of the reflector within a sphere of 2 WL, and the radius of the reflector within 1 WL. The GA adaptation processes were the same as the previous (no reflector) one. The best survivor at each generation was testing by the testing set, and the resulting SINR are presented in the middle plot (first scenario) and the right plot (second scenario), with the same convention as the left plot.

Figure 38:
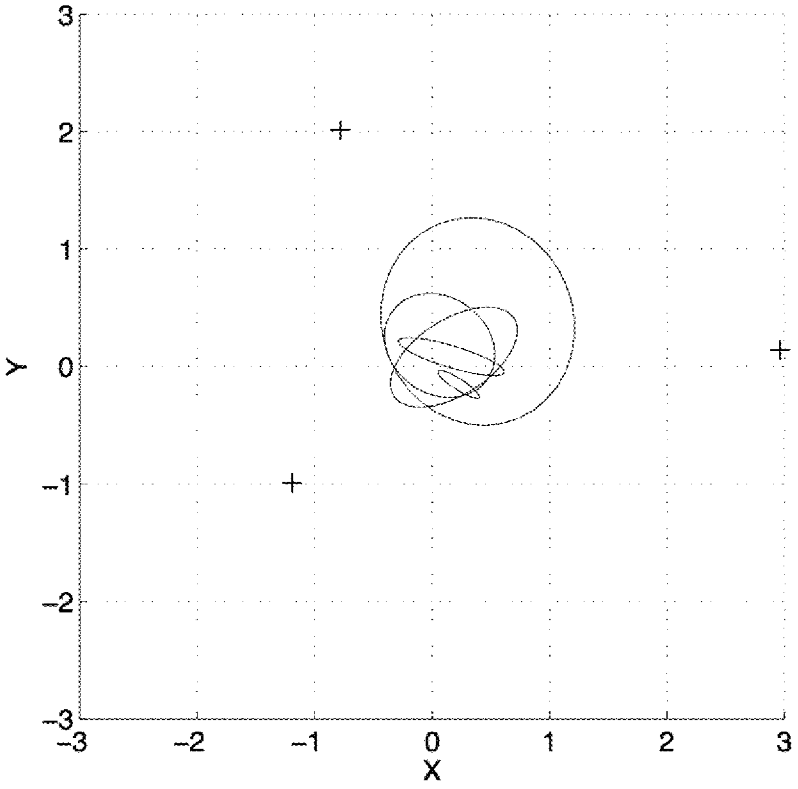
FIG. 38 is a top view of an optimized 3-antenna and 5-reflector (small) configuration.
Figure 39:
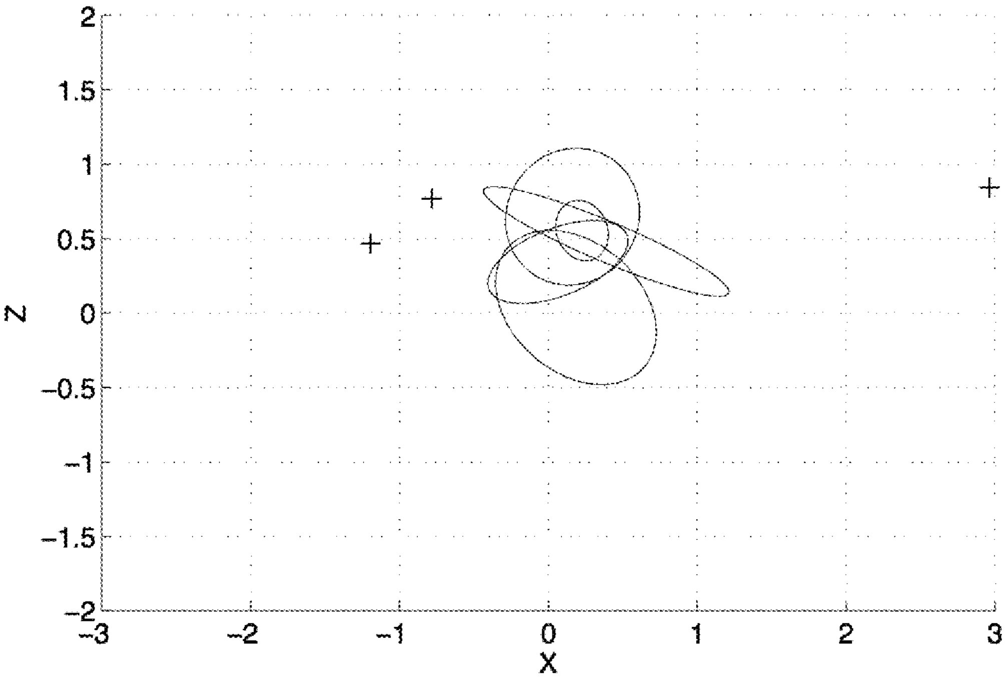
FIG. 39 is a front view of an optimized 3-antenna and 5-reflector (small) configuration.
Figure 40:
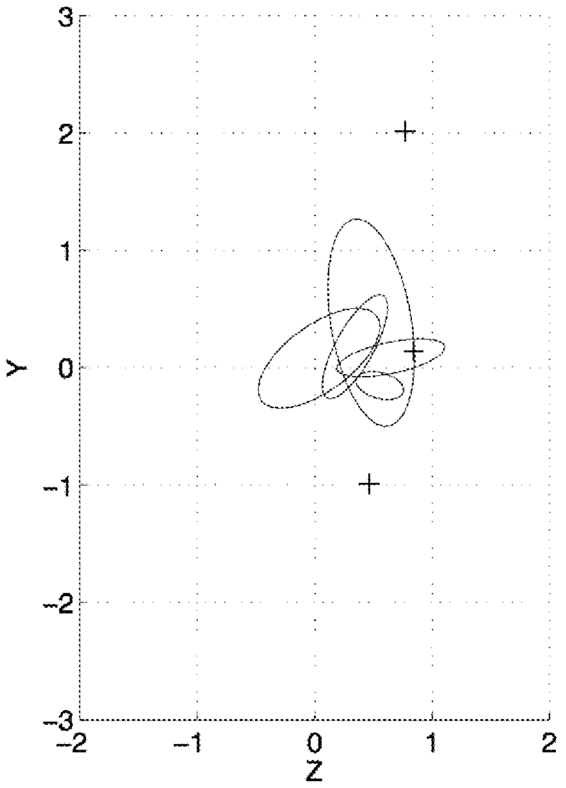
FIG. 40 is a side view of an optimized 3-antenna and 5-reflector (small) configuration.
Figure 41:
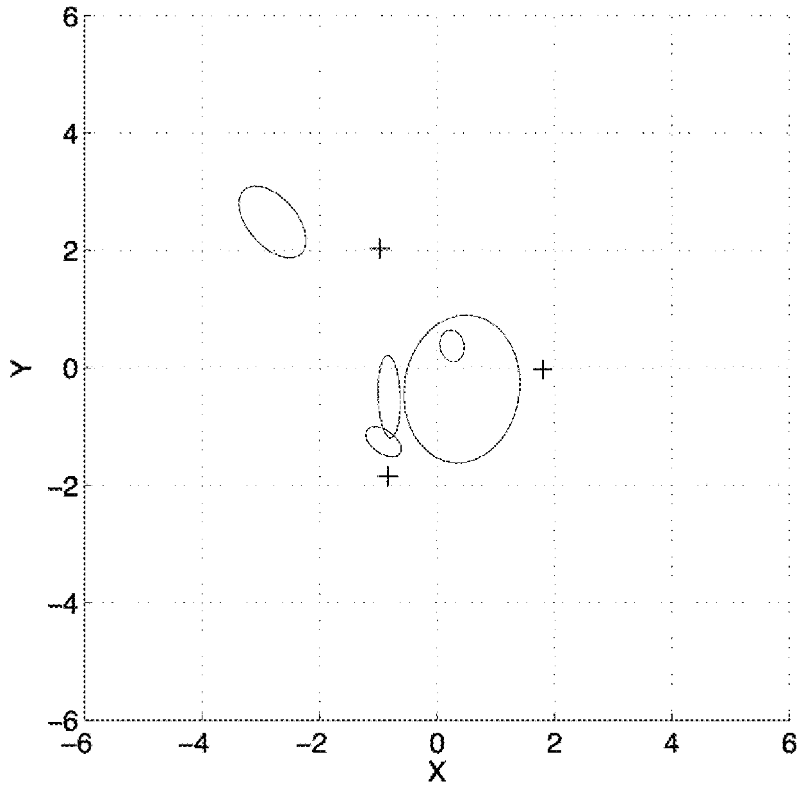
FIG. 41 is a top view of an optimized 3-antenna and 5-reflector (large) configuration.
Figure 42:
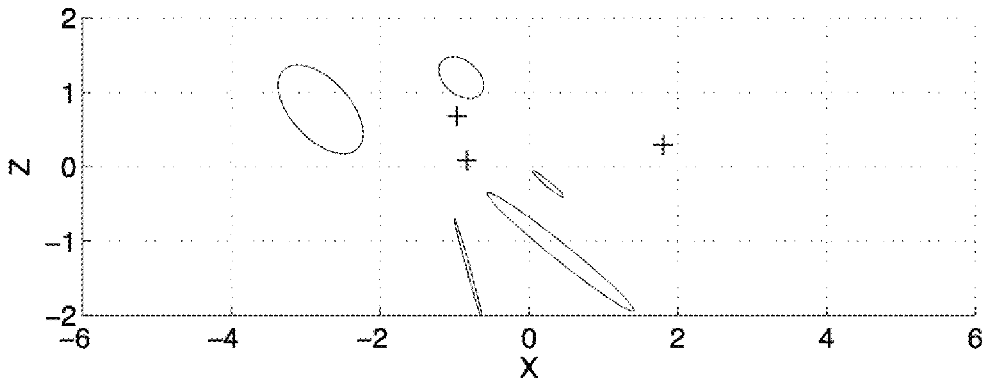
FIG. 42 is a front view of an optimized 3-antenna and 5-reflector (large) configuration.
Figure 43:
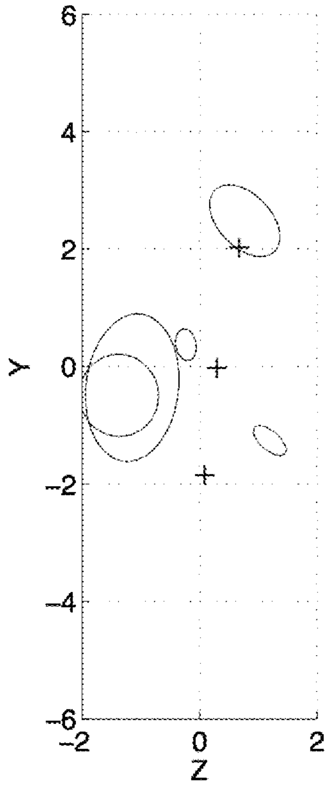
FIG. 43 is side view of an optimized 3-antenna and 5-reflector (large) configuration.
Figure 44:
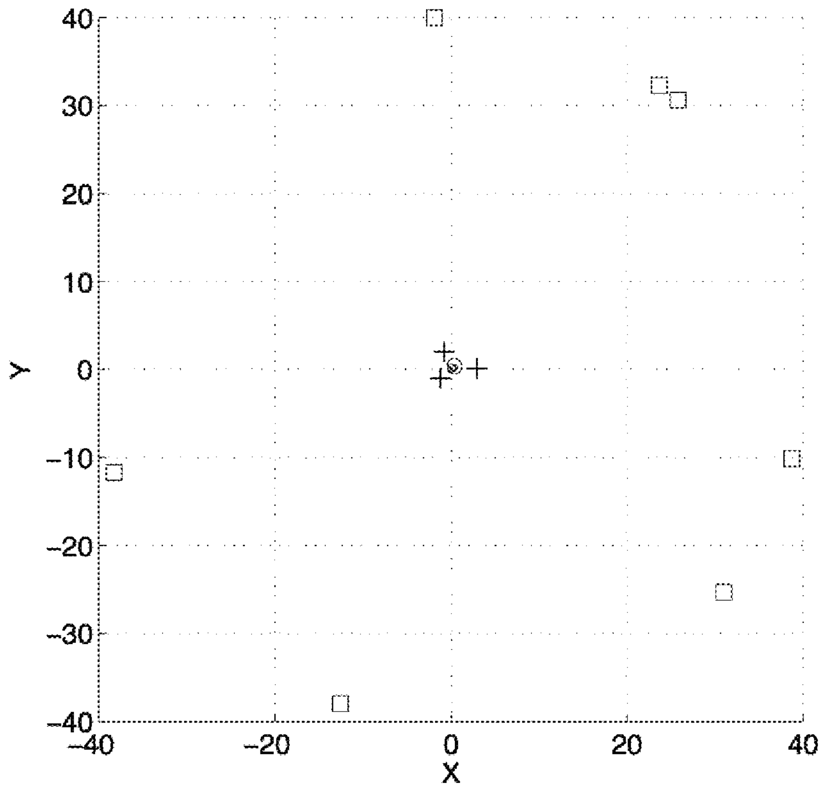
FIG. 44 is a top view of an optimized 3-antenna and 5-reflector (small) configuration with users.
Figure 45:
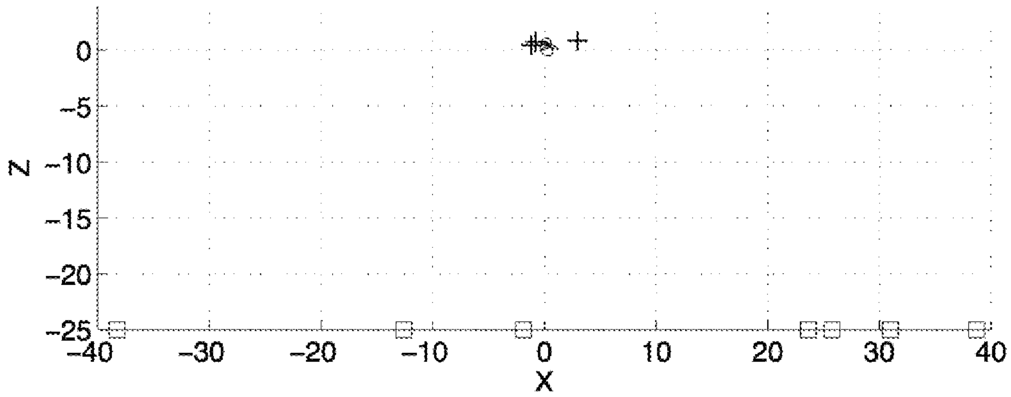
FIG. 45 is a front view of an optimized 3-antenna and 5-reflector (small) configuration with users.
Figure 46:
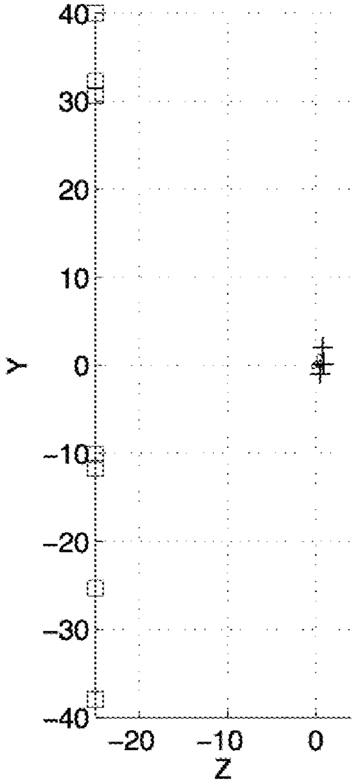
FIG. 46 is a side view of an optimized 3-antenna and 5-reflector (small) configuration with users.
Figure 47:
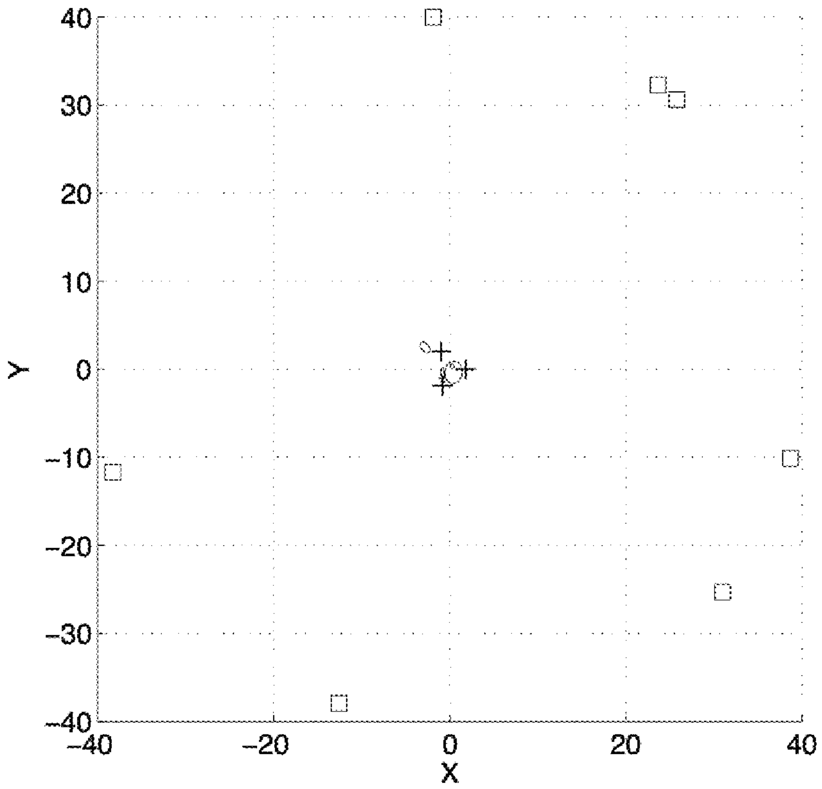
FIG. 47 is a top view of an optimized 3-antenna and 5-reflector (large) configuration with users.
Figure 48:
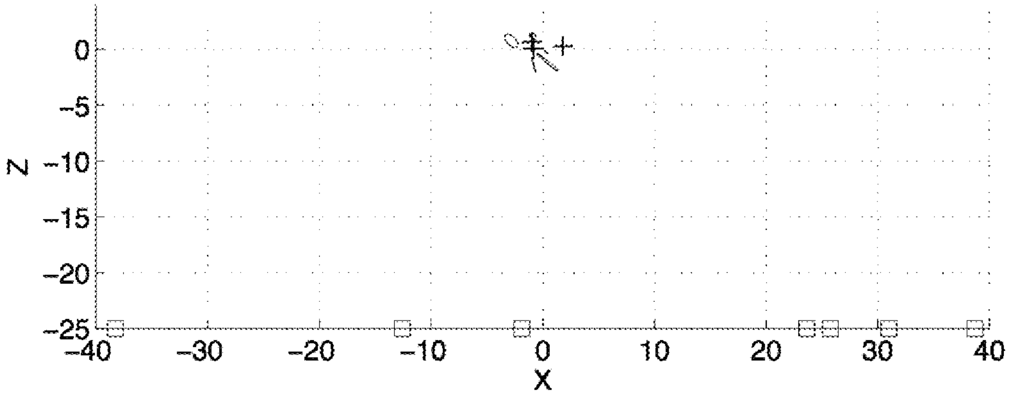
FIG. 48 is a front view of an optimized 3-antenna and 5-reflector (large) configuration with users.
Figure 49:
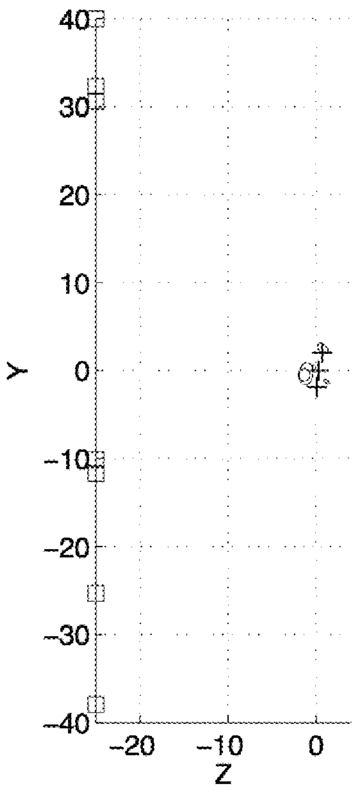
FIG. 49 is a side view of an optimized 3-antenna and 5-reflector (large) configuration with users.
Figure 50:
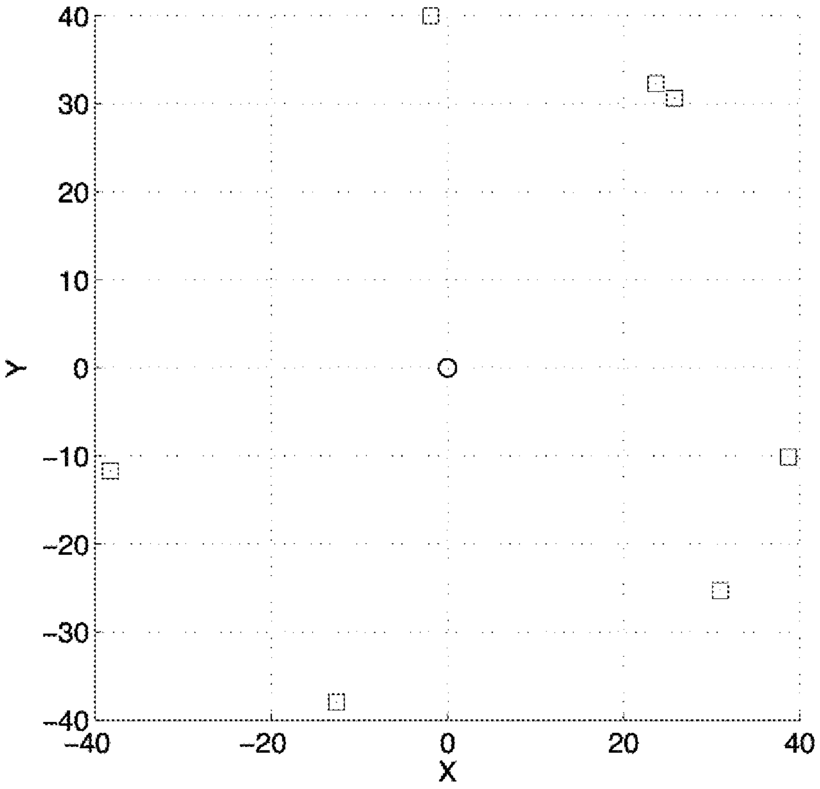
FIG. 50 is a top view of an optimized 3-antenna and 5-reflector (small) configuration with users in a black box representation.
Figure 51:
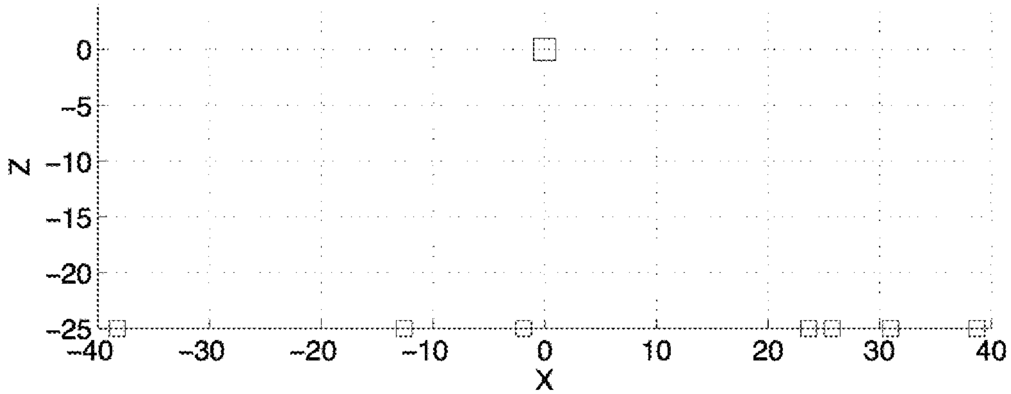
FIG. 51 is a front view of an optimized 3-antenna and 5-reflector (small) configuration with users in a black box representation.
Figure 52:
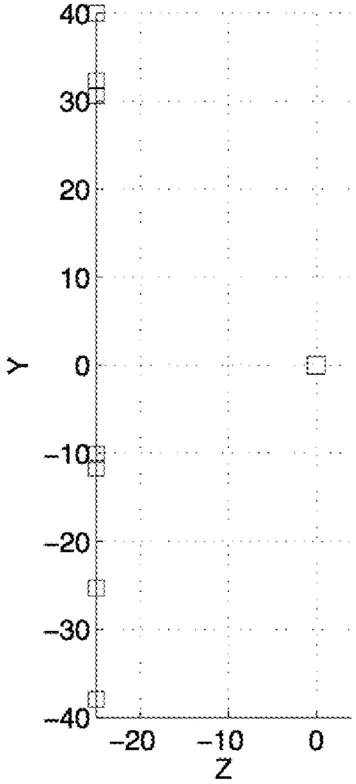
FIG. 52 is a side view of an optimized 3-antenna and 5-reflector (small) configuration with users in a black box representation.
Figure 53:
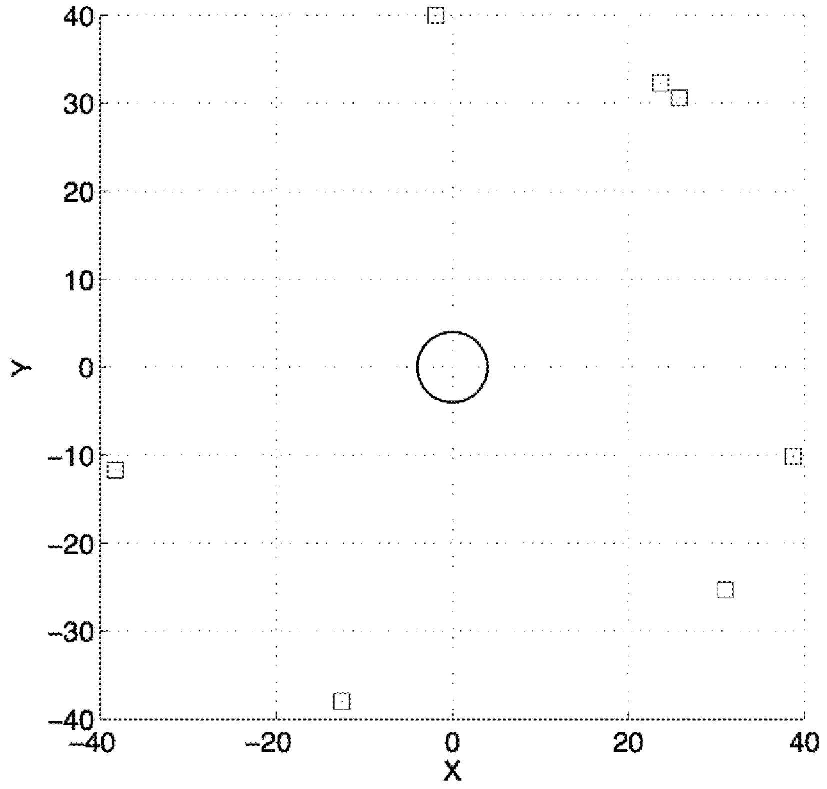
FIG. 53 is a top view of an optimized 3-antenna and 5-reflector (large) configuration with users in a black box representation.
Figure 54:
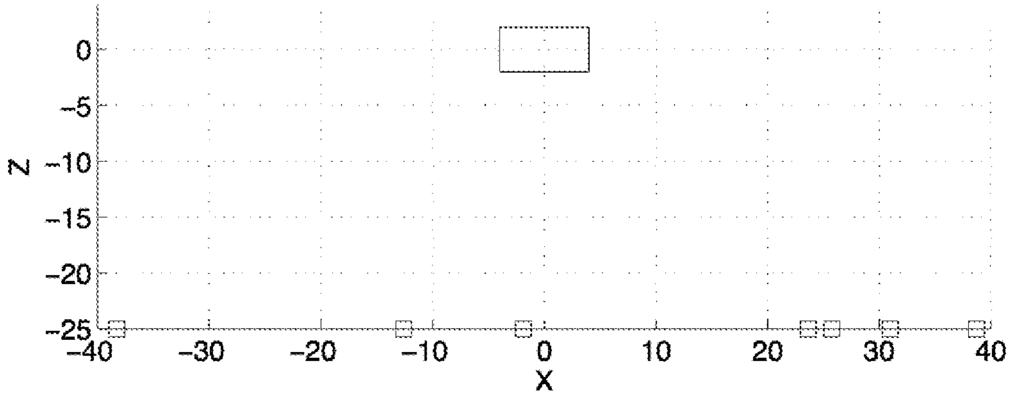
FIG. 54 is a front view of an optimized 3-antenna and 5-reflector (large) configuration with users in a black box representation.
Figure 55:
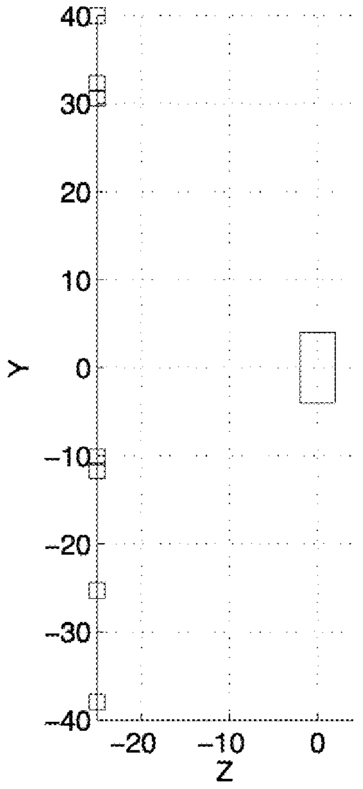
FIG. 55 is a side view of an optimized 3-antenna and 5-reflector (large) configuration with users in a black box representation.

The best survivors of the two scenarios after 20 generations are presented in FIGS. 38 to 40 (first scenario) and FIGS. 41 to 43 (second scenario). Note that the LMS learning are all based on 4096 training bits.

TABLE 1

Optimized 3-antenna configuration-coordinates of the anntenas

| | X | Y | Z |
|---|---|---|---|
| Antenna 1 | 1.68 | −0.11 | 0.70 |
| Antenna 2 | −0.61 | 1.55 | 0.59 |
| Antenna 3 | −1.10 | −1.15 | 0.40 |

TABLE 2

Optimized 3-antenna and 5-reflector (small) configuration - coordinates of the antennas

| | X | Y | Z |
|---|---|---|---|
| Antenna 1 | 2.96 | 0.14 | 0.84 |
| Antenna 2 | −0.78 | 2.01 | 0.77 |
| Antenna 3 | −1.19 | −0.99 | 0.47 |

TABLE 3

Optimized 3-antenna and 5-reflector (small) configuration - parameters of the reflectors ($C_x$, $C_y$, and $C_z$ are the coordinates of the center of the reflector; $N_x$, $N_y$, and $N_z$ are the normal or direction of the reflector; R is the radius of the reflector).

| | Cx | Cy | Cz | Nx | Ny | Nz | R |
|---|---|---|---|---|---|---|---|
| Reflector 1 | 0.39 | 0.38 | 0.48 | −0.42 | −0.17 | −0.99 | 0.89 |
| Reflector 2 | 0.19 | 0.08 | 0.04 | −0.44 | 0.68 | −0.50 | 0.61 |
| Reflector 3 | 0.23 | −0.15 | 0.55 | −0.70 | −1.09 | −0.30 | 0.21 |
| Reflector 4 | 0.06 | 0.18 | 0.34 | −0.35 | −0.49 | 0.88 | 0.50 |
| Reflector 5 | 0.16 | 0.08 | 0.65 | 0.19 | 0.64 | −0.13 | 0.47 |

TABLE 4

Optimized 3-antenna and 5-reflector (large) configuration - coordinates of the antennas

| | X | Y | Z |
|---|---|---|---|
| Antenna 1 | 1.80 | −0.02 | 0.29 |
| Antenna 2 | −0.97 | 2.03 | 0.68 |
| Antenna 3 | −0.83 | −1.85 | 0.09 |

REFERENCES

1. B. Widrow, P. Mantey, L. Griffiths, and B. Goode, "Adaptive antenna systems," *Proc. IEEE*, vol. 55, pp. 2143-2159, December 1967.

2. J. H. Winters, "Optimum combining in digital mobile radio with cochannel interference," *IEEE J. Sel. Areas Commun., vol.* 2, pp. 528-539, July 1984.

3. S. Roy, *Space-Time Processing Techniques with Application to Broadband Wireless Systems*. PhD thesis, Department of Systems and Computer Engineering, Carleton University, August 2000.

4. C. S. Bontu, D. D. Falconer, and L. Strawczynski, "Diversity transmission and adaptive MLSE for digital cellular radio," *IEEE Trans. on Vehicular Technology*, vol. 48, pp. 1488-1502, September 1999.

5. A. Sayeed and V. Raghavan, "Maximizing MIMO capacity in sparse multipath with reconfigurable antenna arrays," *IEEE J. Sel. Topics Signal Process.*, vol. 1, pp. 156-166, June 2007.

6. J. Yang and S. Roy, "On joint transmitter and receiver optimization for multiple-input multiple-output (MIMO) transmission systems," *IEEE Trans. Commun.*, vol. 42, pp. 3221-3231, December 1994.

7. D. Gesbert, M. Shafi, S. Da-shan, P. Smith, and A. Naguib, "From theory to practice: an overview of MIMO space-time coded wireless systems," *IEEE J. Sel. Areas Commun.*, vol. 21, pp. 281-302, April 2003.

8. G. Zhu, B. R. Petersen, and B. G. Colpitts, "Signalling wavelength in an antenna array for space-time wireless over LOS channels," in *Proceedings of the* 3*rd Annual Communications Networks Services and Research Conference* (*CNSR* 2005), vol. 1, (Halifax, NS, Canada), pp. 69-73, May 2005.

9. V. V. N. S. Polu, B. G. Colpitts, and B. R. Petersen, "Symbol-wavelength MMSE gain in a multi-antenna UWB system," in *Proceedings of the* 4*th Annual Communications Networks and Services Research Conference* (*CNSR* 2006), vol. 1, (Moncton, NB, Canada), pp. 95-99, May 2006.

10. H. Yanikomeroglu and E. S. Sousa, "Antenna gain against interference in CDMA macrodiversity systems," *IEEE Trans. Commun.*, vol. 50, pp. 1356-1371, August 2002.

11. R. Kalbasi, D. D. Falconer, and A. H. Banihashemi, "Optimum space-time processors with symbol-rate sampling are bandlimited," *IEEE Trans. Signal Process.*, vol. 54, May 2006.

12. M. A. Jensen and J. Wallace, "A review of antennas and propagation for MIMO wireless communications," *IEEE Trans. Antennas Propag.*, vol. 52, November 2004.

13. P. Jung and P. Alexander, "A unified approach to multiuser detectors for CDMA and their geometrical interpretations," *IEEE J. Sel. Areas Commun.*, vol. 14, pp. 1595-1601, October 1996.

14. A. Goldsmith, S. A. Jafar, N. Jindal, and S. Vishwanath, "Capacity limits of MIMO channels," *IEEE J. Sel. Areas Commun.*, vol. 21, June 2003.

15. L. Liu, W. Hong, H. Wang, G. Yang, N. Zhang, H. Zhao, J. Chang, C. Yu, X. Yu, H. Tang, H. Zhu, and L. Tian, "Characterization of line-of-sight MIMO channel for fixed wireless communications," *IEEE Antennas Wireless Propag. Lett.*, vol. 6, pp. 36-39, 2007.

16. R. Ziegler and J. Cioffi, "A comparison of least squares and gradient equalization for multipath fading in wideband digital mobile radio," in *Conf. Rec. IEEE Globecom* 89, vol. 1, pp. 102-105, November 1989.

17. D. Fogel, "Evolutionary computing," *IEEE Spectr.*, vol. 37, pp. 26-32, February 2000.

18. D. Anastassiou, "Genomic signal processing," *IEEE Signal Process. Mag.*, vol. 18, pp. 8-20, July 2001.

19. M. Jiang and L. Hanzo, "Multiuser MIMO-OFDM for next-generation wireless systems," *Proc. IEEE*, vol. 95, pp. 1430-1469, July 2007.

20. A. J. Viterbi, *CDMA: Principles of Spread Spectrum Communication*. Reading, Mass., USA: Addison-Wesley Publishing Co. Inc., 1995.

21. A. Soong and W. Krzymien, "Effect of antenna diversity on performance of reference symbol assisted interference cancellation in CDMA wireless systems," in *Conf Rec.* 1997 *IEEE 6th International Conference on Universal Personal Communications* (ICUPC), vol. 1, pp. 202-207, October 1997.

22. S. Roy and D. D. Falconer, "Multi-user decision-feedback space-time equalization and diversity reception," in *Conf Rec. IEEE International Conference on Vehicular Technology* (VTC '99), vol. 1, (Houston, Tex., USA), pp. 494-498, May 16-19, 1999.

23. S. Roy and D. D. Falconer, "Optimum infinite-length MMSE multi-user decision-feedback space-time processing in broadband cellular radio," *Wireless Personal Commun.*, vol. 27, pp. 1-32, October 2003.

24. T. S. Rappaport, *Wireless Communications*. Upper Saddle River, N.J., USA: Prentice Hall PTR, 2001.

25. G. Cherubini, E. Eleftheriou, and S. Ölçer, "Filtered multitone modulation for very high-speed digital subscriber lines," *IEEE J. Sel. Areas Commun.*, vol. 20, pp. 1016-1028, June 2002.

26. A. M. Legnain, D. D. Falconer, and A. U. H. Sheikh, "New adaptive combined space-time receiver for multiuser interference rejection in synchronous CDMA systems," in *Conf Rec. Canadian Conference on Electrical and Computer Engineering* (CCECE), vol. 1, (Waterloo, ON, Canada), pp. 421-424, May 24-28, 1998.

27. J. H. Winters, "Upper bounds for the bit error rate of optimum combining in digital mobile radio," in *Conf Rec. IEEE Globecom* 84, vol. 1, pp. 173-178, November 1984.

We claim:

1. A method for generating a configuration of elements for a multi-input and multi-output multi-user antenna array system comprising the steps of:

selecting at least two antennas and at least one electromagnetic signal modifying element, the electromagnetic signal modifying element comprising a geometric object;

applying a genetic algorithm to the system to generate an antenna array system having a configuration optimized for multi-user performance in which the at least two antennas and the at least one electromagnetic signal modifying element form an asymmetric array, the at least one electromagnetic signal modifying element is a stand-alone element non-integral with the antennas, the placement of the at least one electromagnetic signal modifying element promotes randomization of signals from one or more users to one or more of the antennas and allows for blocking of direct path signals from one or more users to one or more of the antennas, thereby increasing multi-path signals within the antenna array system, and the spacing of the antennas and the at least one electromagnetic signal modifying element relative to each another is constrained on the order of symbol wavelengths.

2. The method according to claim 1 wherein the array system is optimized for a property selected from the group consisting of the inverse of the minimum mean square error, of bit error rate, signal to interference plus noise ratio, user capacity, speech quality and sound quality.

3. The method according to claim 1, further including applying the genetic algorithm to the signal modifying element to generate a property of the modifying element by which multi-path signals within the antenna array are increased.

4. The method according to claim 3 wherein the property of the modifying element is selected from the group consisting of position of the modifying element relative to the antenna array, size of the modifying element, orientation of the modifying element relative to the antenna array, and material composition of the modifying element.

5. The method according to claim 1 wherein the step of applying the genetic algorithm includes constraining the spacing of the antennas relative to each another in the range of about 0.1 to about 10 symbol wavelengths.

6. The method according to claim 1 wherein the step of applying the genetic algorithm includes constraining the spacing of the antennas relative to each another in the range of about 1 to about 4 symbol wavelengths.

7. The method according to claim 1 wherein the step of applying the genetic algorithm includes constraining the spacing of the antennas relative to each another in the range of about 0.5 to about 2 symbol wavelengths.

8. The method according to claim 1 wherein the step of applying the genetic algorithm to the antennas includes constraining the volume occupied by the array.

9. An antenna array system designed according to the method of claim 1.

10. The method according to claim 1 wherein the geometric object is selected from the group consisting of a reflector, a refractor, a scatterer and a diffractor.

11. A multi-input and multi-output multi-user antenna array system comprising:

an asymmetric array comprising at least two antennas and at least one electromagnetic signal modifying element, the electromagnetic signal modifying element comprising a geometric object which is a stand-alone element non-integral with the antennas, where the array system is configured such that the antenna array configuration system is optimized for multi-user performance including by promoting randomization of signals from one or more users to one or more of the antennas and allows for blocking of direct path signals from one or more users to one or more of the antennas, thereby increasing multi-path signals within the antenna array system, and wherein the antennas and at least one electromagnetic signal modifying element, are spaced on the order of symbol wavelengths apart.

12. An antenna array system according to claim 11 wherein at least one antenna is optimized for a property selected from the group consisting of geometric position within the system, orientation in the system, size and type of antenna.

13. antenna array system according to claim 11 wherein the signal modifying element is selected from the group consisting of discs, spheres, and cylinders and combinations thereof.

14. The antenna array system according to claim 11 wherein the modifying element has a signal modifying property selected from the group consisting of reflection, refraction, diffraction, scattering and combinations thereof.

15. The antenna array system according to claim 11 wherein the antennas are spaced between about 0.1 and about 10 symbol wavelengths apart.

16. The antenna array system according to claim 11 wherein the antennas are spaced between about 1 and 4 symbol wavelengths apart.

17. The antenna array system according to claim 11 wherein the antennas are spaced between about 0.5 and 2 symbol wavelengths apart.

18. The antenna array system according to claim 11 further including a point-to-point transmitter and wherein the antennas are mounted on cellular network towers.

19. The antenna array system according to claim 11 wherein the geometric object is selected from the group consisting of a reflector, a refractor, a scatterer and a diffractor.

* * * * *